US012603070B2

(12) United States Patent     (10) Patent No.:   US 12,603,070 B2

Wrona     (45) Date of Patent:    Apr. 14, 2026

(54) SPEED REDUCING INSTRUMENT TUNER AND ASSEMBLIES THEREOF

(71) Applicant: MANA INSTRUMENTS, INC., Fairport, NY (US)

(72) Inventor: Matthew Wrona, Fairport, NY (US)

(73) Assignee: MANA INSTRUMENTS, INC., Fairport, NY (US)

( * ) Notice: Subject to any disclaimer, the term of this patent is extended or adjusted under 35 U.S.C. 154(b) by 303 days.

(21) Appl. No.: 18/427,140

(22) Filed: Jan. 30, 2024

(65) Prior Publication Data

US 2025/0246168 A1     Jul. 31, 2025

(51) Int. Cl.
*G10D 3/14*      (2020.01)
*F16H 1/10*      (2006.01)

(52) U.S. Cl.
CPC ................. *G10D 3/14* (2013.01); *F16H 1/10* (2013.01)

(58) Field of Classification Search
CPC .... G10D 3/14; G10D 3/00; F16H 1/10; F16H 1/32; F16H 2001/323
See application file for complete search history.

(56) References Cited

U.S. PATENT DOCUMENTS 4,151,778 A * 5/1979 Beattie ..................... G10D 3/14
                                           984/119
4,271,726 A    6/1981 Ryffel 5,103,708 A    4/1992 Steinberger
6,023,014 A    2/2000 Sperzel
7,816,594 B2   10/2010 Vochezer
10,269,332 B1   4/2019 Rickard et al.
12,057,094 B2   8/2024 Dunwoodie et al.
2011/0162507 A1   7/2011 Lauffer
2022/0020343 A1   1/2022 Dunwoodie et al.

FOREIGN PATENT DOCUMENTS

GB        2470715 A    8/2010

OTHER PUBLICATIONS

Matos, Taina (PCT Authorized Officer), "Notification of Transmittal of the International Search Report and the Written Opinion of the International Searching Authority, or the Declaration," issued Mar. 31, 2025 in corresponding PCT Application No. PCT/US2025/ 013819, 11 pages.

\* cited by examiner

*Primary Examiner* — Kimberly R Lockett
(74) *Attorney, Agent, or Firm* — MH2 Technology Law Group LLP

(57) ABSTRACT

The present disclosure relates to a machine head reducer or assembly, including a housing with a central axis and a surface with a plurality of undulations substantially parallel and equidistant to the central axis, a first driven member having a central axis which is substantially concentric with the housing central axis, a second axis parallel and eccentric to the central axis, a second driven member having a central axis substantially concentric with the second axis of the first driven member with a first surface having a plurality of undulations in mesh contact with the undulations of the housing surface, a second surface having a plurality of undulations where the undulations of the first surface and the undulations of the second surface are parallel and equidistant to the second driven member central axis.

28 Claims, 14 Drawing Sheets

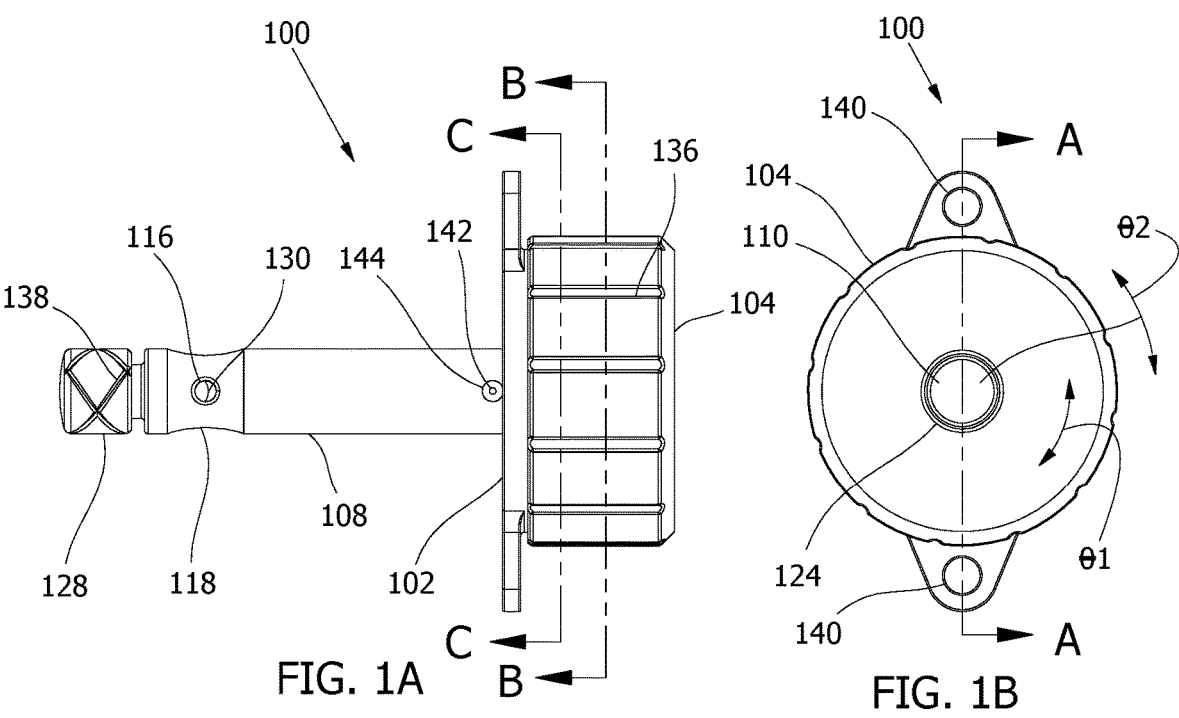
FIG. 1A
FIG. 1B
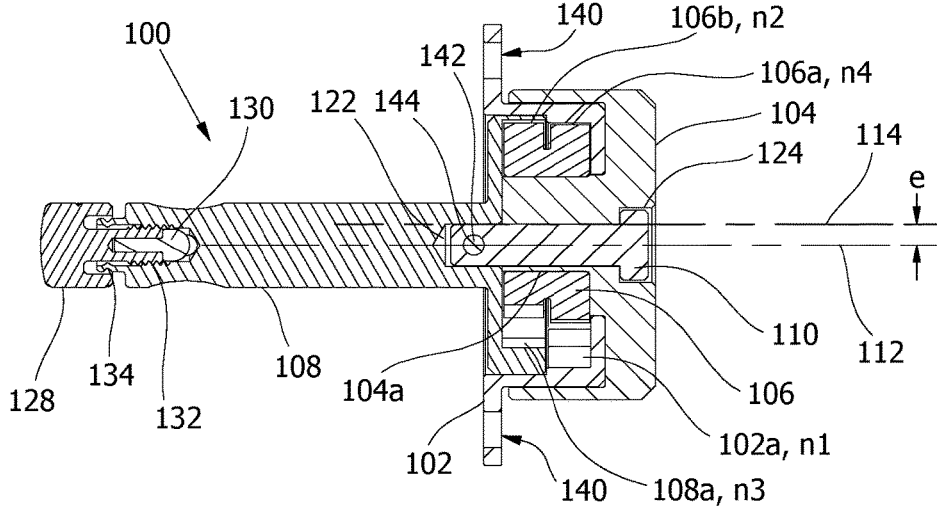
SECTION A-A
FIG. 1C

SECTION B-B

SECTION C-C

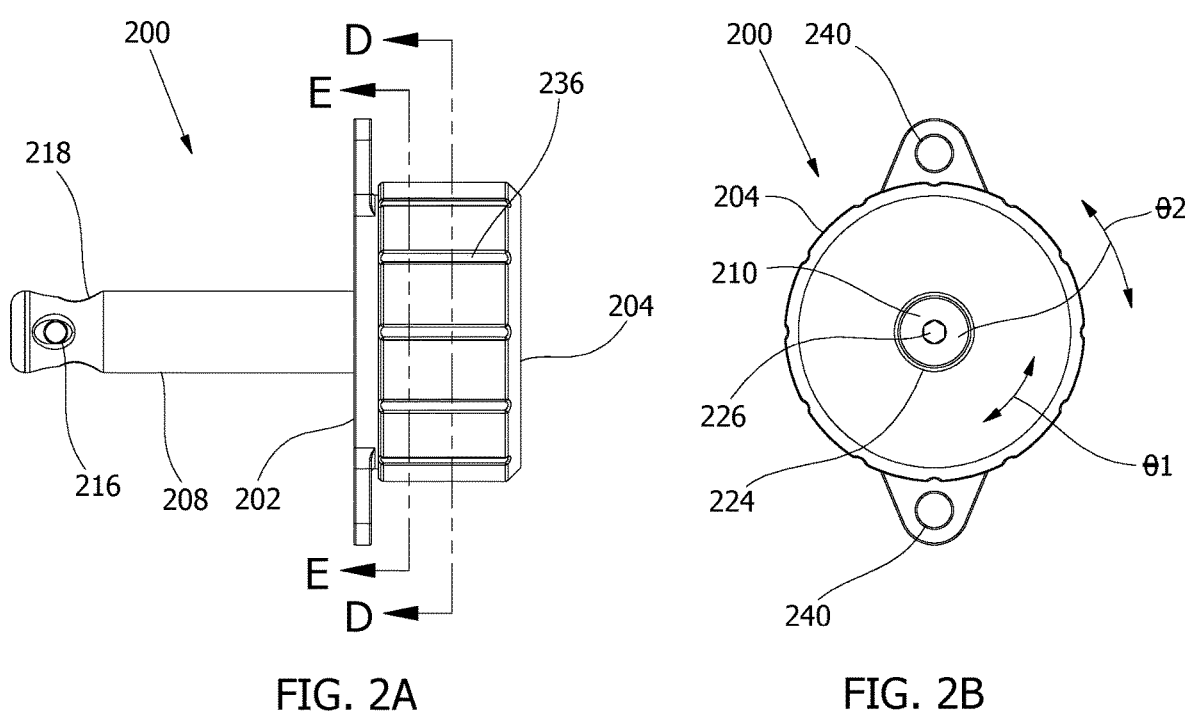
FIG. 2A
FIG. 2B
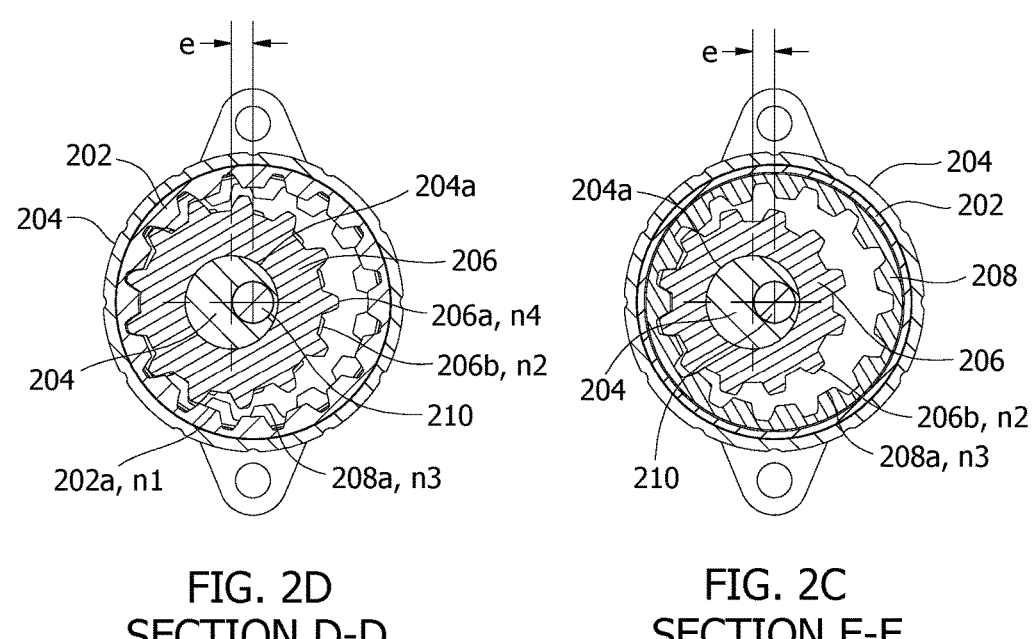
FIG. 2D
SECTION D-D
FIG. 2C
SECTION E-E

FIG. 3A                                                    FIG. 3B

SECTION F-F

SECTION A-A

SECTION E-E

SECTION F-F

SECTION G-G

SPEED REDUCING INSTRUMENT TUNER AND ASSEMBLIES THEREOF

TECHNICAL FIELD

The present teachings relate generally to speed reducers and, more particularly, to speed reducer geared instrument tuning machines.

BACKGROUND

Stringed instrument tuning machines, also known as tuning pegs, tuners, instrument tuners, or machine heads, are essential components of such instruments that allow musicians to adjust the tension and pitch of the strings on instruments such as guitars, violins, and basses. The purpose of tuning machines is to enable precise and stable tuning, which is essential for achieving the desired musical tones and harmonies. This also ensures that the instrument remains in tune throughout a performance or practice session.

The history of tuning machines can be traced back hundreds of years, with various designs and mechanisms employed to address the challenge of keeping strings at the correct tension for optimal sound quality. Traditional friction pegs, for example, have been used on instruments like violins and violas for centuries. These pegs rely on friction to hold the strings in place, and while they have a classic and elegant appearance, they require manual adjustments, which can be somewhat challenging and time-consuming, especially for novice musicians.

In the more recent past, geared tuning machines have become the standard for many stringed instruments. These tuners employ a mechanical gear mechanism, typically a worm and worm wheel, which provides a mechanical advantage, making it easier for musicians to turn the pegs and make precise adjustments to the string tension. The gears ensure that the tuning process is more straightforward and stable, even for those who are less experienced in the art of tuning. Geared tuning machines have become especially popular for stringed acoustic guitars and electric guitars.

Moreover, recent years have seen the introduction of digital tuning machines. These devices utilize digital displays or LED lights to guide musicians in achieving accurate tuning. This approach can further be integrated with self-tuning systems. These systems employ automated mechanisms to electronically adjust the string tension and pitch. Self-tuning systems can offer rapid and precise tuning, reducing the need for manual adjustments. However, they are typically associated with higher costs, lower reliability, and are considered more complex, as they require additional maintenance and may be beyond the scope of musicians who prefer a traditional or simpler tuning experience. They further can rely on the use of mechanical or geared tuning machines.

There exists a need for affordable, high-quality tuning machines that provide durable, low-maintenance, precise, stable tuning while conforming to certain form factors compatible with conventional stringed instrument design. There also exists a need for high precision tuning machines which also offer means to expedite the process of string replacement. There also exists a need for simplified speed reducers which offer high mechanical efficiency. There also exists a need for simplified speed reducers which offer a non-backdrivable output. There also exists a need for simplified speed reducers which, with minor modifications, can be built as either reversing or non-reversing.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A machine head reducer is disclosed. The machine head reducer may comprise of a housing having a central axis and a surface including a plurality of undulations (n1) that are substantially parallel and equidistant to the central axis. The machine head reducer may also include a first driven member having a central axis that is substantially concentric with the central axis of the housing, where the first driven member may include a second axis parallel and eccentric to the central axis of the housing. The machine head reducer may also include a second driven member having a central axis that is substantially concentric with second axis of the first driven member and may include a first surface having a plurality of undulations (n4) that are substantially parallel and equidistant to the second driven member central axis and being in mesh contact with the undulations (n1) of the housing surface, a second surface having a plurality of undulations (n2) that are substantially parallel and equidistant to the second driven member central axis. The reducer also may include a third driven member having a central axis being substantially concentric with the housing central axis and having a surface having a plurality of undulations (n3) where the undulations of the surface of the third driven member are substantially parallel and equidistant to the central axis of the third driven member and are in mesh contact with the second surface undulations of the second driven member (n2). Implementations of the machine head reducer can include where the number of undulations of the housing, first gear surface, second gear surface and output shaft surface are from about 2 to about 100. The number of housing undulations (n1), the number of second surface undulations of the second driven member (n2), the number of first surface undulations of the second driven member (n3), and the number of undulations of the surface of the third driven member (n4) are determined using the equation: $\theta2=1-n1 \cdot n2n3 \cdot n4$, and where $\theta2$ is a rotational direction of the third driven member. The machine head reducer may include at least one of the surfaces having a plurality of undulations which are involute. The machine head reducer may include at least one of the surfaces having a plurality of undulations which are cylindrical. The machine head reducer may include at least one of the surfaces having a plurality of undulations which are curved. The machine head reducer may include at least one of the surfaces having a plurality of undulations which are helical. The machine head reducer may include where the number of undulations of the second driven member first surface may be unequal to the number of undulations of the second driven member second surface. The machine head reducer may include an actuator coupled to the housing. The first driven member may be driven by the actuator. The actuator may be externally powered. The machine head reducer may operate at a constant velocity. The machine head reducer may operate at a non-constant velocity. The third driven member may include an output receiver wherein the output receiver is configured to receive an instrument string. The second driven member may include a single compound gear which may comprise of a first undulated surface and a second undulated surface. The machine head reducer may include an instrument string locking mechanism positioned within the third driven member. The second driven member may be configured such that a rotation direction of the first driven member results in a same rotation direction of the third driven member. The second driven member may be config- ured such that a rotation direction of the first driven member results in an opposite rotation direction of the third driven member. The plurality of undulations (n1) of the housing surface may face inward toward the central axis, the second driven member first surface undulations and the second driven member second surface undulations (n4 and n2) may face outward from the second driven member central axis, and the third driven member surface undulations (n3) may face inward toward the central axis. The plurality of undu- lations (n1) of the housing surface may face outward away from the central axis, the second driven member first surface undulations and the second driven member second surface undulations (n4 and n2) may face inward toward the second driven member central axis, and the third driven member surface undulations (n3) may face outward away from the central axis. The third driven member may have a first position along the first housing central axis where the third driven member surface undulations are engaged in mesh contact with the second driven member second surface undulations and the third driven member has a second position along the first housing central axis wherein the third driven member surface undulations are disengaged from mesh contact with the second driven member second surface undulations. The machine head reducer may further include a biasing element wherein the third driven member is biased to the first position along the housing central axis. The machine head reducer may include at least one first driven member clutch tooth or undulation wherein the first driven member may have a first position along the housing central axis wherein the second driven member first surface undu- lations are engaged in mesh contact with the housing surface undulations and at least one first driven member clutch tooth or undulation is disengaged with the third driven member surface undulations and the first driven member may have a second position along the housing central axis wherein the second driven member first surface undulations are disen- gaged from mesh contact with the housing surface undula- tions and at least one first driven member clutch tooth or undulation is engaged with the third driven member surface undulations. The machine head reducer may further include a biasing element wherein the first driven member is biased to the first position along the housing central axis.

A machine head assembly is disclosed. The machine head assembly includes a plurality of machine head reducers, each machine head reducer may include: a housing having a central axis and a surface which may include a plurality of undulations (n1) that are substantially parallel and equidis- tant to the central axis, a first driven member having a central axis that is substantially concentric with the central axis of the housing, the first driven member may include a second axis parallel and eccentric to the central axis of the housing, a second driven member having a central axis that is substantially concentric with second axis of the first driven member and may include: a first surface having a plurality of undulations (n4) that are substantially parallel and equi- distant to the second driven member central axis and being in mesh contact with the undulations (n1) of the housing surface, a second surface having a plurality of undulations (n2) that are substantially parallel and equidistant to the second driven member central axis where a number of undulations of the second surface is unequal to a number of undulations of the first surface. The assembly may also include a third driven member having a central axis being substantially concentric with the housing central axis and having a surface having a plurality of undulations (n3) where the undulations of the surface of the third driven member are substantially parallel and equidistant to the central axis of the third driven member and are in mesh contact with the second surface undulations of the second driven member. The assembly may also contain at least one machine head reducer which has a gear ratio which is unequal to the gear ratio of at least one of the other machine head reducers. The assembly may also include where the second driven member of at least one of the machine head reducers is configured such that a rotation direction of the first driven member results in a same rotation direction of the third driven member. The assembly may also include where the second driven member of at least one of the machine head reducers is configured such that a rotation direction of the first driven member results in an opposite rotation direction of the third driven member.

The features, functions, and advantages that have been discussed can be achieved independently in various imple- mentations or can be combined in yet other implementations further details of which can be seen with reference to the following description.

BRIEF DESCRIPTION OF THE DRAWINGS

The accompanying drawings, which are incorporated in and constitute a part of this specification, illustrate embodi- ments of the present teachings and together with the descrip- tion, serve to explain the principles of the disclosure. In the figures:

FIGS. 1A-1E are schematic views of an exemplary speed reducing instrument tuner, in accordance with the present disclosure.

FIGS. 2A-2F are schematic views of another exemplary speed reducing instrument tuner, in accordance with the present disclosure.

FIGS. 3A-3E are schematic views of an exemplary speed reducing instrument tuner, in accordance with the present disclosure.

Figure 1D:
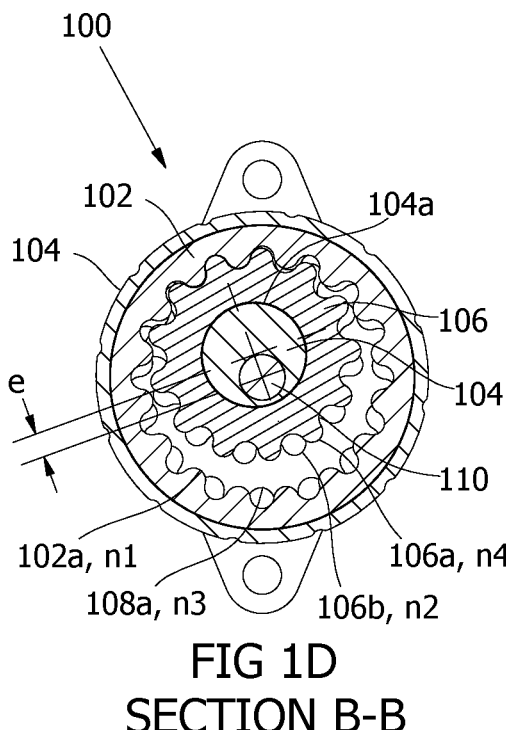

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure provides improvements to common geared instrument tuners, also referred to as machine heads. The tuning machines of the present disclosure provide the application of an eccentric driven compound gear which meshes or interacts with a stationary gear and also meshes with a gear fixed to an output shaft. The tuning machine actuator is conveniently in-line with the tuner peg, also referred to as the output shaft, provides a non-backdrive function, a potentially high reduction ratio, a reverse rotation option, and means to expedite string replacement.

As used herein, an eccentric driven gear is defined as a type of gear mechanism where one of the gears is mounted off-center, or eccentrically, on its shaft or axis. An eccentric driven gear can alternatively be referred to as an offset gear, an eccentric gear, a non-concentric gear, a planet gear, a cycloid gear, or an epicyclic gear. This off-center, journal mounting provides an eccentric, cycloidal motion to the gear, which can be exploited in some applications, to create a rotation to the gear, opposite to the rotation direction of the input member as a result of being in mesh contact with a stationary gear.

As used herein, a compound gear, stacked gear, gear train, or gear assembly can be considered as a combination of two or more gears being integral or coupled along a common axis to provide a mechanical advantage or a specific gear ratio. In examples, compound gears can be utilized to allow for transmission of torque and speed between multiple gears in a single system.

A gear can be considered an eccentric driven compound gear when being integral or coupled with a second concentric gear having at least one tooth or undulation number different from the tooth or undulation number of the first eccentric driven gear where a rotation of the input shaft which eccentrically drives the compound gear in an opposite rotational direction as a result of first being in mesh with the internal stationary gear and provides a speed reduced rotational motion to an output shaft as the result of being secondly in mesh contact with the internal movable gear which is integral or coupled to the output shaft.

In applications of instrument tuners, it is possible to mount the input shaft concentric or in-line with the output shaft. It is also possible to arrange the teeth or undulation numbers to produce reversing or non-reversing output rotation direction. It is also possible to arrange the teeth or undulation numbers to produce a non-backdrive function.

Examples of the present disclosure provide instrument tuning machines having a non-backdrive function. This non-backdrive, also referred to as a non-reversible characteristic, refers to a mechanism that resists or inhibits reverse motion, preventing external forces or torque from easily causing the system to move in a direction of external force. This non-backdrive function is the result of an external rotational force applied to the output shaft being transferred through one or more of the teeth or undulations of the output shaft movable gear to one or more of the teeth or undulations of the second gear of the compound gear which integrally transfers the rotational force to one or more of the teeth or undulations of the first gear of the compound gear which is countered by one or more of the teeth or undulations of the housing stationary gear. The external rotational force is transferred from the output shaft movable gear through the compound gear to the stationary gear and produces no significant vector or component which acts in the direction perpendicular to the offset direction of the eccentric axis making it ineffective at causing rotation and back-driving the input. This feature can be advantageous in applications, particularly in stringed instrument tuning applications where precision and stability are critical.

A speed reducer gear can be defined as a component in a mechanical system, or alternatively the system itself, which is designed to decrease the output speed of an input source while increasing the resulting output torque. In a stringed instrument tuning application, this feature can be leveraged to provide precise control over the rotational speed and the resulting output position or torque.

The speed reducer tuning machines of the present disclosure operate according to one or more gearing ratios based on an equation which can include multiple solutions for tuning and locking the string to the tuner output shaft. The gear train obeys the following formula, Equation (1):

$$\theta 2 = 1 - \left[ (n1 \cdot n2)/(n3 \cdot n4) \right] \tag{1}$$

Where $\theta 2$ is defined as the resulting rotation direction and magnitude of the output shaft as caused by $\theta 1$, where $\theta 1$ is defined as the rotation direction and magnitude of the input knob where $n1$ is the number of teeth or undulations of the stationary member, $n3$ is the number of teeth or undulations of the output shaft, $n4$ is the number of teeth or undulations of the compound gear portion which is in mesh contact with $n1$, and $n2$ is the number of teeth or undulations of the compound gear portion which is in mesh contact with $n3$.

This equation allows the speed reducing instrument tuning machine head to be built to function as a non-reversing, clockwise (CW) input to clockwise (CW) output. This equation also allows the speed reducing instrument tuning machine head to be built as a reversing, clockwise (CW) input to counter-clockwise (CCW) output. As the result of reversing the input rotation direction, a non-reversing speed reducing instrument tuning machine head functions as a counter-clockwise (CCW) input to counter-clockwise (CCW) output and a reversing speed reducing instrument tuning machine head functions as counter-clockwise (CCW) input to a clockwise (CW) output. In an example of a non-reversing arrangement, the stationary internal housing gear has 16 teeth, or undulations (n1), the rotating internal output shaft gear has 15 teeth or undulations (n3), the first gear of the compound gear has 13 teeth or undulations (n4), which mesh with the 16 teeth or undulations of the stationary housing, the second gear of the compound gear has 12 teeth or undulations (n2), which mesh with the 15 teeth or undulations of the output shaft, the result when computed according to Equation (1) is: $1-[(16*12)/(15*13)]$, which equals $1-[192/195]$, which equals approximately $1-0.9846\ldots$, which equals approximately $0.0154\ldots$, where the inverse equals approximately $1/0.0154\ldots$ or 65, corresponding to an understood ratio of 65:1.

In an example of a reversing arrangement, the stationary internal housing gear has 15 teeth or undulations (n1), The rotating internal output shaft gear has 16 teeth or undulations (n3), the first gear of the compound gear has 12 teeth or undulations (n4), which mesh with the 15 teeth or undulations of the stationary housing, the second gear of the compound gear has 13 teeth or undulations (n2) which mesh with the 16 teeth or undulations of the output shaft, the result when computed according to Equation (1) is: $1-[(15*13)/(16*12)]$ which equals $1-[195/192]$, which equals $1-1.015625$ which equals $-0.015625$, where the inverse equals $1/-0.015625$ or $-64$, corresponding to an understood ratio of $-64:1$.

This arrangement, which is further described in reference to the following figures, allows a stringed instrument to be fitted with any combination of speed reducing instrument tuning machine heads having any practical combination of differing input to output ratios. This arrangement also allows a stringed instrument to be fitted with any combination of speed reducing instrument tuning machine heads having non-reversing or reversing direction output, or both, which can be useful for "3 up 3 down" or "3+3," "inline 6," classical, and opposite hand instruments, as well as any number of tuning arrangements or configurations. While exemplary examples are provided for use in stringed instrument tuning machines and assemblies, the concepts and arrangements described herein may be utilized in hoists, winches, instruments, tools, or other mechanical systems where the provided advantages are useful. The input can be driven manually or powered by, but not be limited to, a cable, wheel, pulley, drum, crank, lever, gear, rack, chain, sprocket, belt, linkage, clutch, friction drive, engine, motor, actuator, transmission, gear train, or driven directly from the output shaft of a power source. The output can drive, but not be limited to, a cable, wheel, pulley, drum, crank, lever, gear, rack, chain, sprocket, belt, linkage, clutch, friction drive, actuator, transmission, jack screw, ball screw, crusher, agitator, elevator, mechanical arm, robot joint, door, or gear train. The concepts and arrangements described herein may be fitted with washers, bushings, anti-friction bearings, seals, lubrication features, lubrication methods, pre-load elements, sensors, balancing members, and other additions to reducers, well known to those familiar with the art.

In certain examples, undulations within gears or other components, such as housings, output shafts, or other features can be involute, cycloidal, elliptical, V shaped, cardioid, or combinations thereof. The aforementioned terms refer to profiles or shapes of gear teeth or undulations that are used in the gears of the present disclosure. An involute profile can be defined by a curve where a tangent point on the curve rolls along the base circle of the gear as it rotates. An advantage of involute gears is their smooth and constant motion transmission, which thereby can produce efficient operation with reduced wear or noise. A cycloidal profile gear, tooth, or undulation includes profile defined by a cycloid. This profile can be useful when employing small numbers of undulations by avoiding undercut teeth present in involute profiles. Elliptical gears incorporate undulations or teeth shaped like an ellipse, also referred to as an elongated oval. Such elliptical gears can provide non-uniform motion and be used in for situations having non-standard gear interactions. Curved undulation shapes may also employ methods found in commonly in gerotor pumps and like mechanisms generated from trochoid curves including, but not limited to, cycloid, parachoid, epitrochoid, hypotrochoid and expanded cardioids.

In examples of instrument tuning machines provided in the present disclosure, the gears therein may operate at a constant or a non-constant velocity, referring to the aspect where an output shaft rotates at a uniform speed when compared with input rotation speed, which is achieved by varying the number and style of undulations of one or more gears within the instrument tuning machine. For example, the number and style of undulations in a stationary housing, which then causes the compound or driven gear to rotate, can influence the velocity of the output shaft, where the speed at which the driven compound gear and therefore the output shaft rotates depends on the shape of the gears and their number of undulations. Furthermore, the ratios of the number of teeth between the driver and driven gears determines the gear ratio and, subsequently, the speed ratio, as dictated by Equation (1). In examples, the number of undulations associated with any of n1, n2, n3, or n4 or the respective surfaces within the embodiments described herein can be from about 1 to about 100, from about 2 to 100, from about 3 to about 50, or from about 5 to about 20.

FIGS. 1A-1E are schematic views of an exemplary speed reducing instrument tuner, in accordance with the present disclosure. As shown in FIG. 1A, a side view of a machine head reducer 100 is shown. The machine head reducer 100 includes a housing 102 at a first end, with an input knob 104, also referred to as a first driven member, attached thereto having an input grip 136. While a particular pattern of input grip 136 is shown, other patterns or arrangements of input grip features can be used based on ergonomic or aesthetic principles, and therefore the pattern and shape shown herein should not be considered to be limiting. The machine head reducer 100 further includes an output shaft 108 connected to and through the housing 102. The output shaft 108 further includes a shaft groove 118 configured to be circumferential around an upper portion of the output shaft 108, with an output receiver 116 or a hole positioned within the shaft groove 118 configured to accept and anchor a string for an instrument. Within the output receiver 116 is a locker piston 130 positioned within the output shaft 108 and configured to translate along an axis of the output shaft 108. At an end of the output shaft 108 opposite the housing 102 is a locker knob 128 having one or more locker grip 138 features. While a particular pattern of locker grip 138 is shown in FIG. 1A, other patterns, shapes or arrangements of locker grip features can be used.

FIG. 1B illustrates an end view of the machine head reducer 100 of FIG. 1A. From this view, a retainer 110 is shown, recessed within the input knob retainer cavity 124. The retainer holds the output shaft 108 and the input knob 104 in place within the housing 102. Each side of the housing 102 further includes a mounting tab 140 with a hole positioned within the mounting tab 140 for mounting the machine head reducer 100 onto a flat surface. While a particular style and arrangement of mounting tab 140 is shown in FIG. 1B, other styles patterns or arrangements can be used. Indicators A-A designate the cross-sectional view as shown in FIG. 1C. It should be noted that the indicator θ1 denotes an input direction provided by a user in actuation of the input knob 104 of the machine head reducer 100, while θ2 indicates an output direction of the output shaft 108. As noted previously, the ratios of the number of teeth between the driver and driven gears determines the gear ratio and, subsequently, the speed ratio, and also determines the output direction of θ2 based on the direction of input θ1 as dictated by Equation (1).

FIG. 1C shows a cross-section of the machine head reducer 100 as designated by indicators A-A. This view illustrates the mounting mechanism and location of the locker knob 128 onto the end of the output shaft 108 using a locker thread 132 to advance the location and increase the pressure exerted by the locker piston 130, which is attached to the threaded locker knob 128. The locker stake 134 prevents the locker knob 128 and the locker piston 130 from separating from the output shaft 108. Also shown within the output shaft 108 is a retainer hole 122 and a retainer pin hole 144 through which the retainer 110 is interlocked to the output shaft 108 by retainer pin 142 within first axis 112 of the input knob 104, housing 102, output shaft 108, and retainer 110. The input knob 104, which can be considered to be a first driven member having a first central axis 112 that is substantially concentric with the central axis of the housing 102 and having a second axis 114 which is parallel to the first central axis 112 and eccentrically located relative to central axis 112 and forms input knob eccentric surface 104a, is coupled to the housing 102, in this example, by being an integral part of the outer housing, but in alternate examples the input knob 104 can include a separate part fixedly or releasably attached to the housing 102 that operates as an actuator to drive the compound gear 106, which can also be considered a second driven member. In this and other exemplary examples the actuator can be externally powered, cause the machine head reducer 100 to operate at a constant velocity when driven, or combinations thereof. Internal to the housing is a single compound gear 106, which can be considered to be a second driven member having a central axis which is substantially concentric with eccentric axis 114, and having first gear undulations 106a, (represented by n4), and second gear undulations 106b. The first gear undulations 106a are on a first, lower level of the gear 106, closer to the housing end, while the second gear undulations 106b (represented by n2) are on a second, higher level of the gear 106, closer to the output shaft 108 end. On an external housing end of the output shaft 108, which can be considered a third driven member and having a central axis which is substantially concentric with first axis 112, are several output shaft undulations 108a (represented by n3), while an internal portion of the housing 102, which includes a first central axis 112, also includes several housing undulations 102a. This plurality of substantially cylindrical undulations (represented by n1) are substantially parallel and equidistant to the central axis and face inward towards the first central axis 112 of the housing 102. These features will also be described in greater detail later. In these and other figures, "e" designates the eccentricity of the second axis 114 relative to the first axis 112. The input knob 104 is located upon and rotates about first axis 112 and has an eccentric surface 104a which establishes a parallel second axis 114 which locates the position of compound gear 106 within the machine head reducer 100.

FIG. 1D illustrates a cross-section end view of the machine head reducer 100 as designated by indicators B-B in FIG. 1A. Within the housing 102 end shown, the housing undulations 102a protrude from an inner surface of the housing 102. The indicator n1 is a number of undulations associated with the inner surface housing undulations 102a. The housing undulations 102a interface with and enmesh with the first gear undulations 106a, the number of which is indicated by n4. Shown in the background, are the second gear undulations 106b, which interface with the output shaft undulations 108a, which will be described in further detail in FIG. 1E and have a number of undulations represented by indicators n2 and n3, respectively.

Figure 1E:
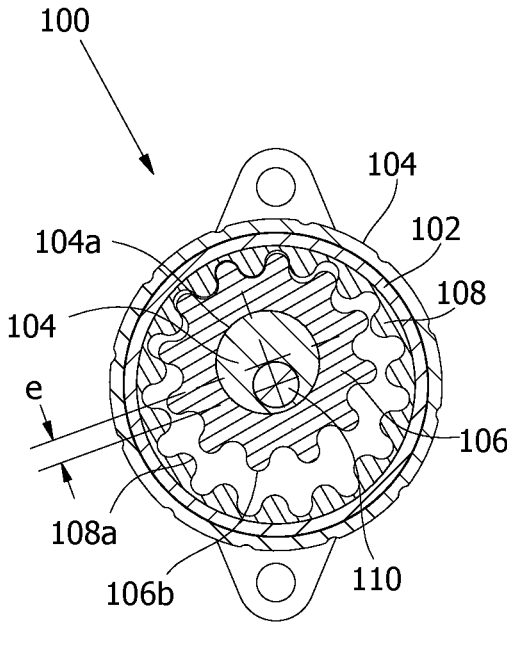

FIG. 1E illustrates a cross-section end view of the machine head reducer 100 as designated by indicators C-C in FIG. 1A. Shown within the housing 102 end, the second, upper part of the gear 106 is highlighted. Output shaft 108 includes several output shaft undulations 108a, the number of which is designated by n3. Also shown here are the second gear undulations 106b, the number of which is designated by n2, which engage with the output shaft undulations 108a on output shaft 108. By taking the portions of the gear 106 shown and described in regard to FIGS. 1D and 1E, it can be shown that as input knob 104 is rotated in direction θ1, the eccentric knob input surface 104a rotates eccentrically causing the first gear undulations 106a of gear 106 to engage in succession, with the housing undulations 102a, As gear 106 is a single, fixedly connected, compound gear 106, each section of gear 106 rotate together as a single entity. As input knob 104 is rotated in direction θ1, the eccentric knob input surface 104a rotates eccentrically and also causes the second gear undulations 106b of gear 106 to engage, in succession, with the output shaft undulations 108a resulting in the input to output ratio according to equation (1). The resulting output may either be in the non-reversing direction to the input rotation direction (CW to CW) or (CCW TO CCW) or the resulting output may be in the reverse direction to the input rotation direction (CW to CCW) or (CCW to CW) according to equation (1).

The machine head reducer 100, as shown in FIGS. 1A-1E, functions as a non-reversing reducer resulting from the arrangement of the components and their respective numbers of undulations. An embodiment of a reversing reducer can be made which encompasses the same or similar envelope as the shown non-reversing reducer 100 by altering the arrangement of the components and their respective numbers of undulations. Although several arrangements of the components and many combinations of the respective numbers of undulations are possible, the result of equation 1 may either be a positive number (producing a non-reversing reducer), a negative number (producing a reversing reducer), or zero (producing an ineffectual reducer).

Figure 2E:
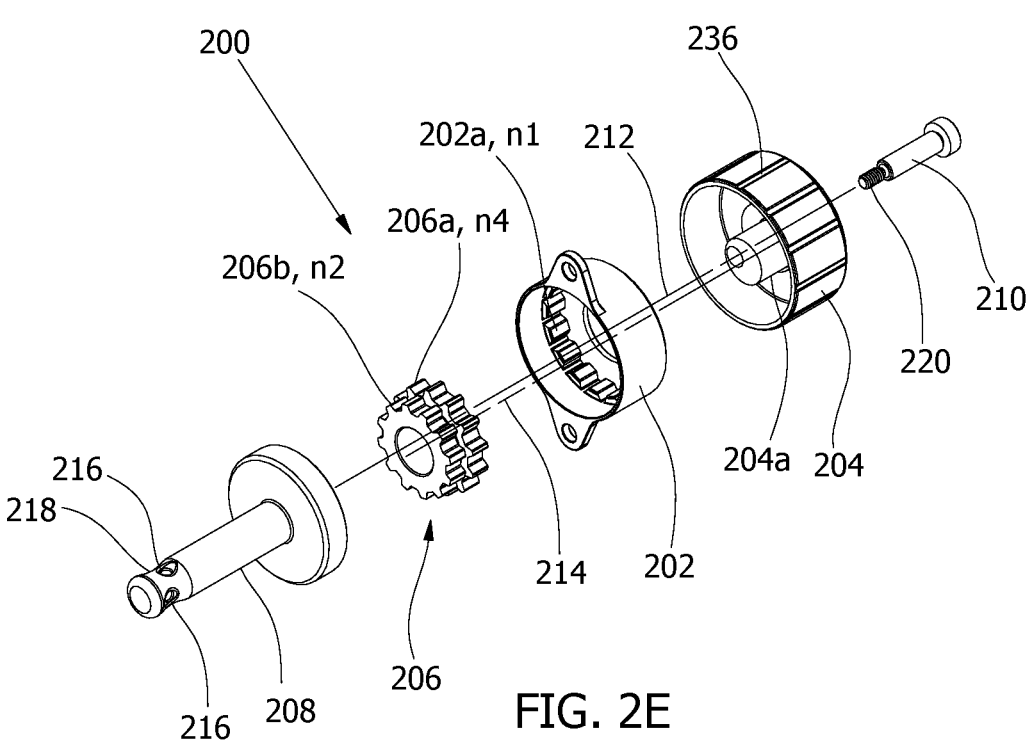

FIGS. 2A-2F are schematic views of another exemplary speed reducing instrument tuner, in accordance with present disclosure. FIG. 2A illustrates a machine head reducer 200 having similar features as the other examples described herein. The machine head reducer 200 includes a housing 202 having several housing undulations 202a inside an inner wall of the housing 202, which will be described in further detail herein. The machine head reducer 200 includes an input knob 204 having an input grip 236 for improved ergonomics and comfort grip when a user actuates the input knob 204 for the purposes of tightening or loosening an instrument string using the machine head reducer 200 and in turn increasing or decreasing the tension enacted thereupon. An output shaft 208 protrudes from the housing 202 and comprises a shaft groove 218 having one or more output receivers 216 there-through for receiving and anchoring an instrument string, a feature which would be well-known to one skilled in the art. Although the shaft groove 218 is shown as a single concentric groove, other configurations are possible, including, but not limited to, multiple grooves, helical groves, multiple helical grooves, and non-concentric grooves. In examples of this or other embodiments including helical undulations or grooves, these helical features on the surfaces of one or more gears or surfaces can be parallel to one another, or in instances perpendicular. The length of the output shaft 208 in this example of a machine head reducer 200 and others is configured to be long enough to traverse through a headstock or other mounting area of a stringed instrument to receive a string at an end of the shaft groove 218 while being mounted on an opposite side. It should be noted that other examples of a machine head reducer 200 can have alternate mounting tabs or means of mounting that would be known to one skilled in the art. It should be also noted that the output shaft 208 can be supported by bearings or bushings at multiple or alternative locations along the output shaft 108 length. FIG. 2B is an end view of the machine head reducer 200 illustrating two mounting boss 240 attachments connected to the housing 202 for flat, flush, or recessed mounting on an instrument surface. In this view, a retainer 210 is shown, further comprising an input knob retainer cavity 224 and a retainer thread 226, used to retain the output shaft 208 and the input knob 204 to the housing 202 of the machine head reducer 200. Although the retainer 210 is shown as a separate, removable component, it is possible to incorporate retainer 210 as an extension of output shaft 208 and provide an alternate method of retaining the output shaft 208 and the input knob 204 to the housing 202 including, but not limited to, a deformation stake, a snap lock, a nut, a pin, or a retaining ring.

FIG. 2C illustrates a cross-section end view of the machine head reducer 200 as designated by indicators D-D in FIG. 2A. Within the housing 202 end shown, the housing undulations 202a protrude from an inner surface of the housing 202. The housing undulations 202a, are shown in this embodiment to represent gear teeth that are curved such as, but not limited to trochoid, involute, cycloidal, elliptical, helical, inclined, truncated, or stub. As in previous examples, and as defined by Equation (1), the indicator n1 is a number of undulations associated with the inner surface housing undulations 202a. The housing undulations 202a interface with and enmesh with the first gear undulations 206a, the number of which is indicated by n3. Shown in the background, are the second gear undulations 206b, which interface with the output shaft undulations 208a, which will be described in further detail in FIG. 2D and have a number of undulations represented by indicators n2 and n4, respectively. As input knob 204 is rotated in direction θ1 or θ2, the eccentric knob input surface 204a rotates eccentrically causing the first gear undulations 206a of gear 206 to engage in succession, with the housing undulations 202a, As gear 206 is a single, fixedly connected, compound gear, each section of gear 206 rotate together as a single entity. As input knob 204 is rotated, the eccentric knob input surface 204a rotates eccentrically and also causes the first and second gear undulations 206a and 206b respectively of gear 206 to engage, in succession, with the stationary housing undulations 202a and the output shaft undulations 208a resulting in the input to output ratio according to equation (1). The resulting output may either be in the non-reversing direction to the input rotation direction (CW to CW) or (CCW TO CCW) or the resulting output may be in the reverse direction to the input rotation direction (CW to CCW) or (CCW to CW) according to equation (1).

FIG. 2D illustrates a cross-section end view of the machine head reducer 200 as designated by indicators E-E in FIG. 2A. Shown within the housing 202 end, the second, upper part of the gear 206 is highlighted. Output shaft 208 includes several output shaft undulations 208a, the number of which is designated by n3. Also shown here are the second gear undulations 206b, the number of which is designated by n2, which engage with the output shaft undulations 208a on output shaft 208. By taking the portions of the gear 206 shown and described in regard to FIGS. 2C and 2D, it can be shown that as input knob 204 is rotated, housing undulations 202a engage the lower first gear undulations 206a of gear 206. As gear 206 is a single, fixedly connected, monolithic gear 206, as first gear undulations 206a are engaged and rotated by actuating the input knob 204, second gear undulations 206b also engage and rotate in the same direction as first gear undulations 206a. Then, in turn, second gear undulations 206b engage with the output shaft undulations 208a on the output shaft 208, thus rotating the output shaft 208 in the direction and speed according to equation (1) relative to to direction and speed that input knob 204 is actuated or turned.

Figure 2F:
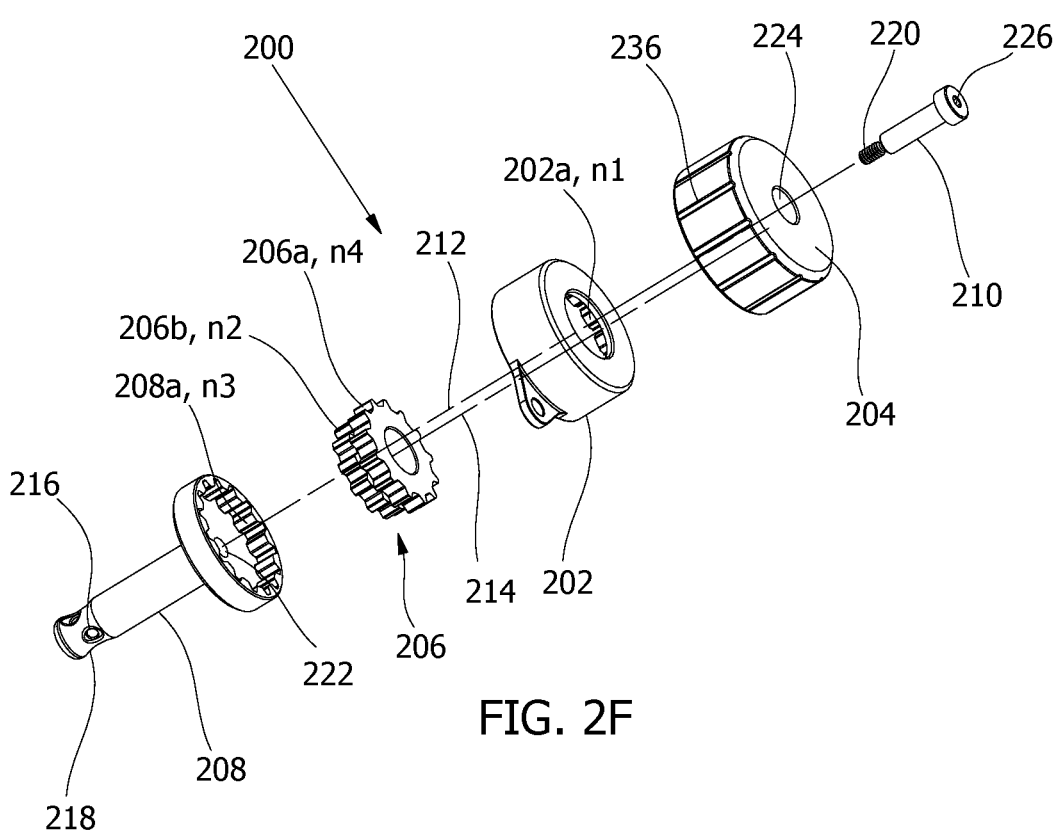

FIGS. 2E and 2F are exploded views of the machine head reducer 200 of FIGS. 2A-2D. When assembled, the machine head reducer 200 is built by first placing input knob 204, which includes eccentric knob input surface 204a and second axis 214, over housing 202 which forms axis 212. Next compound gear 206 is placed over the input knob eccentric surface 204a where the first gear undulations 206a of compound gear 206 enmesh with housing undulations 202a. Next, the output shaft 208 is placed into housing 202 where the second gear undulations 206b of compound gear 206 enmesh with the output shaft undulations 208a on the output shaft 208. The output shaft 208 further includes an output receiver 216, a shaft groove 218, and retainer hole 222. Next, retainer 210 is inserted through input knob 204 and secured to output shaft 208 by retainer thread 220 and retainer hole 222.

Figure 3C:
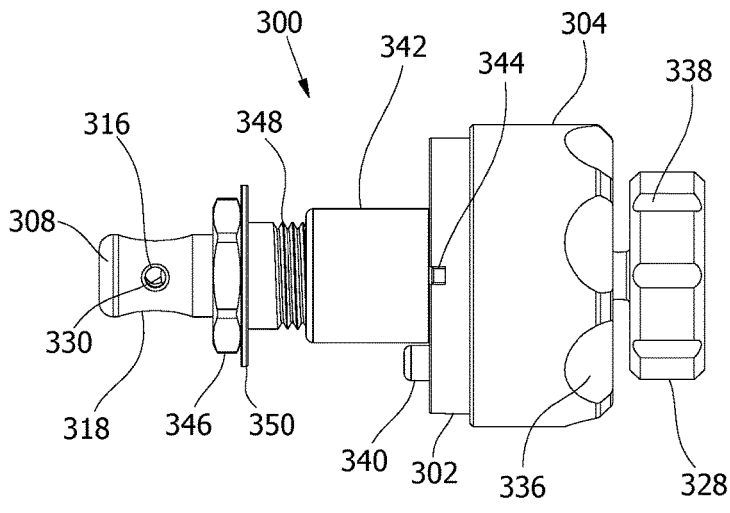
Figure 3C:
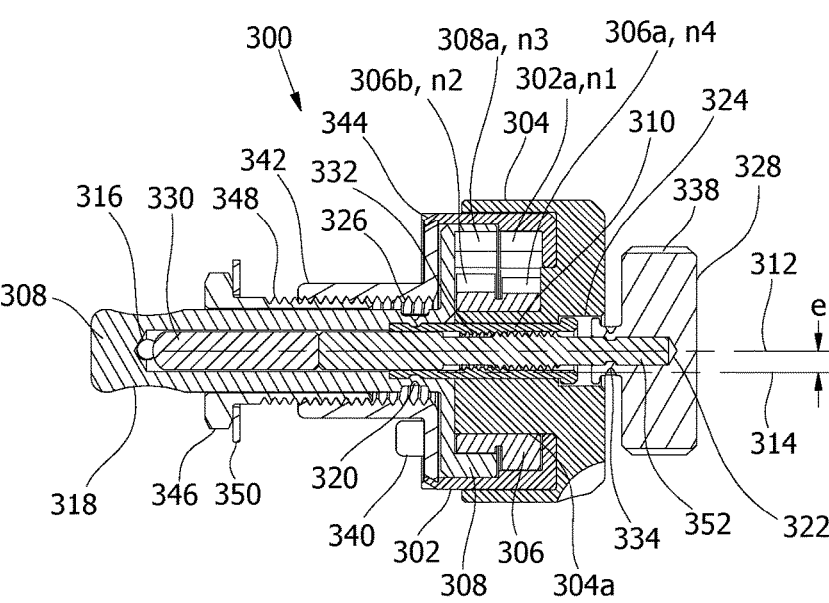

FIGS. 3A-3F are schematic views of an exemplary speed reducing instrument tuner, in accordance with the present disclosure. FIGS. 3A-3F illustrate a machine head reducer 300 having similar features as the other examples described herein. The machine head reducer 300 includes a housing 302 having several housing undulations 302a inside an inner wall of the housing 302, which will be described in further detail herein. The machine head reducer 300 includes an input knob 304 having several input grip 236 features for improved ergonomics and comfort grip when a user actuates the input knob 304 for the purposes of tightening or loosening an instrument string using the machine head reducer 300 and in turn increasing or decreasing the tension enacted thereupon. The example shown in FIG. 3A further includes a locker knob 328 attached to and through the knob input 304, for the purpose of locking a position of a string inserted into an output receiver 316 of output shaft 308 on the machine head reducer 300 by advancing a locker piston 330 within the output shaft 308 to lock and affix a string inserted into the output receiver 316. The output shaft 308 protrudes from the housing 302 and further comprises a shaft groove 318 having an output receiver 316 there-through for receiving and anchoring an instrument string, a feature which would be well-known to one skilled in the art. The length of the output shaft 308 in this example of a machine head reducer 300 and other examples shown and described herein is configured to be long enough to traverse through a head stock or other mounting area of a stringed instrument to receive a string at an end of the shaft groove 318 while being mounted on an opposite side. It should be noted that other examples of a machine head reducer 300 can have alternate mounting tabs or means of mounting that would be known to one skilled in the art. For the purposes of mounting the machine head reducer 300 to an instrument and preventing undesirable movement, mounting boss 340 is shown on housing 302, as well as an adapter nut thread 348 for applying a washer 350, nut 346, and adapter 342 during mounting. One skilled in the art would be familiar with similar mounting hardware for machine head reducer 300 or instrument tuning machines. It should further be noted that the mounting hardware shown in FIGS. 3A-3F may be interchangeable with alternate examples of machine head reducer 300 or other examples shown and described herein. FIG. 3B is a bottom view of the machine head reducer 300 illustrating an end view of the locker knob 328 and the knob input 304 in this example.

FIG. 3C illustrates a cross-section side view of the machine head reducer 300 as designated by indicators F-F in FIG. 3B. Within the machine head reducer 300, an output shaft 308 having a shaft groove 318 and output receiver 316 is shown. The orifice of the output receiver 316 can be restricted and locked by utilizing the locker piston 330 that can be advanced through the interior of the output shaft 308 by rotating the locker knob 328, which can be rotated to engage the locker stem 352 along the retainer cavity 324 by advancing the locker thread 332 to press the locker piston 330 to constrict the orifice of the output receiver 316 to lock or clamp an instrument string inserted there-through. Also, as shown in FIG. 3C, retainer stake 320 holds the retainer 310 in the machine head reducer 300. The cross-section side view of FIG. 3C further illustrates the position of the housing 302, input knob 304, and compound gear 306 within the machine head reducer 300, including the relative locations of the housing undulations 302a which engage with first gear undulations 306a and drive the compound gear 306 when the knob input 304 is rotated to then, in turn, rotate the second gear undulations 306b, which engage with and drive output shaft undulations 308a in the output shaft 308, according to the examples described previously within the present disclosure. As in previous examples, and as defined by Equation (1), the indicator n1 is a number of undulations associated with the inner surface housing undulations 302a. The housing undulations 302a interface with and enmesh with the first gear undulations 306a, the number of which is indicated by n3. The second gear undulations 306b, which interface with the output shaft undulations 308a, have a number of undulations represented by indicators n2 and n4, respectively. As input knob 304 is rotated in direction θ1 or θ2, the eccentric knob input surface 304a rotates eccentrically causing the first gear undulations 306a of gear 306 to engage in succession, with the housing undulations 302a, As gear 306 is a single, fixedly connected, compound gear, each section of gear 306 rotate together as a single entity. As input knob 304 is rotated, the eccentric knob input surface 304a rotates eccentrically and also causes the first and second gear undulations 306a and 306b respectively of gear 306 to engage, in succession, with the stationary housing undulations 302a and the output shaft undulations 308a resulting in the input to output ratio according to equation (1). The resulting output may either be in the non-reversing direction to the input rotation direction (CW to CW) or (CCW TO CCW) or the resulting output may be in the reverse direction to the input rotation direction (CW to CCW) or (CCW to CW) according to equation (1). Also shown in FIG. 3C is nut thread 348, nut 346, washer 350, adapter 342, and mounting boss 340 which can be utilized to anchor the machine head reducer 300 onto an instrument surface, neck portion, head-stock, or body. In examples, the adapter 342 can be used to provide additional size for the machine head reducer 300 to be mounted within an existing hole or cavity that may be oversized relative to the output shaft 308 portion of the machine head reducer 300. One or more adapter stakes 344 are present in the housing 302 for receiving and aligning the adapter 342. The indication of "e" designates the eccentricity of the second axis 314 relative to the first axis 312.

Figures 3D, 3E:
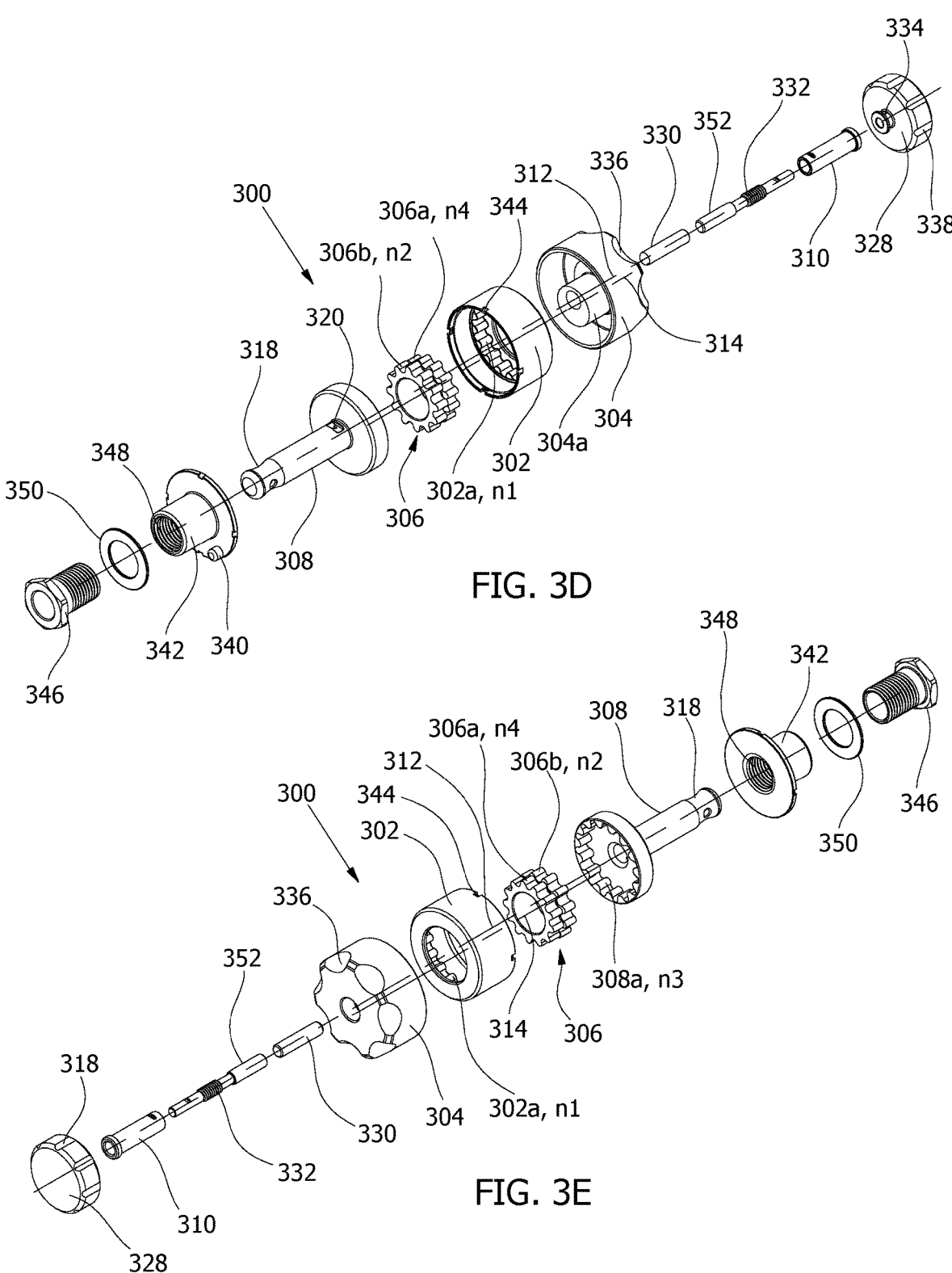

FIGS. 3E and 3F are exploded views of the machine head reducer 300 of FIGS. 3A-3C. When assembled, the machine head reducer 300 is built by first placing the input knob 304, which includes eccentric knob input surface 304a and second axis 314 over the housing 302 which forms axis 212. Next compound gear 306 is placed over the input knob eccentric surface 304a where the first gear undulations 306a of compound gear 306 enmesh with housing undulations 302a. Next, the output shaft 308 is placed into housing 302 where the second gear undulations 306b of compound gear 306 enmesh with the output shaft undulations 308a on the output shaft 308. The output shaft 308 further includes a shaft groove 318, and retainer stake 320. Next, locker piston 330 is inserted into the output shaft 308 and locker stem 352 is threaded into retainer 310 which includes locker thread 332 for translating the position of the locker stem 352. Next, retainer 310 is inserted through the input knob 304 and secured to output shaft 308 by retainer stake 320. Next, locker knob 328 is engaged onto locker stem 352 and secured by locker stake 334. Next, mounting adapter 342 is secured to the housing 302 by several adapter stakes 344 which receive and align mounting adapter 342. Next in order to secure the reducer 300 to an instrument, the mounting nut 346 and mounting washer 350 are secured by being threaded into the mounting adapter 342 using nut thread 348. It should be noted that the assembly and features shown are illustrative and non-limiting in nature.

Figure 4A:
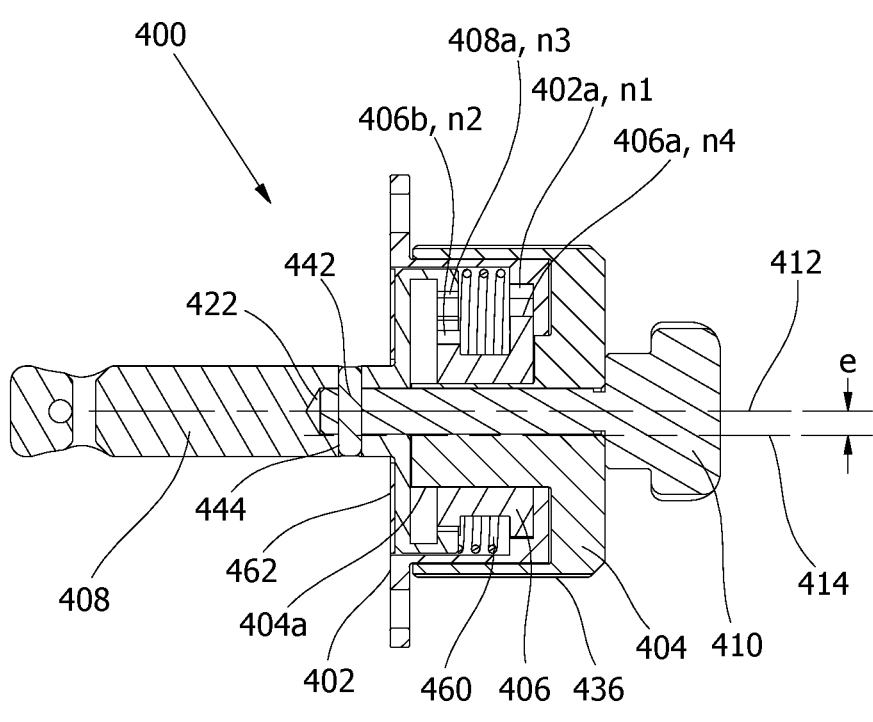
FIGS. 4A-4B are side schematic views of another exem- plary speed reducing instrument tuner, in accordance with the present disclosure.
Figure 4B:
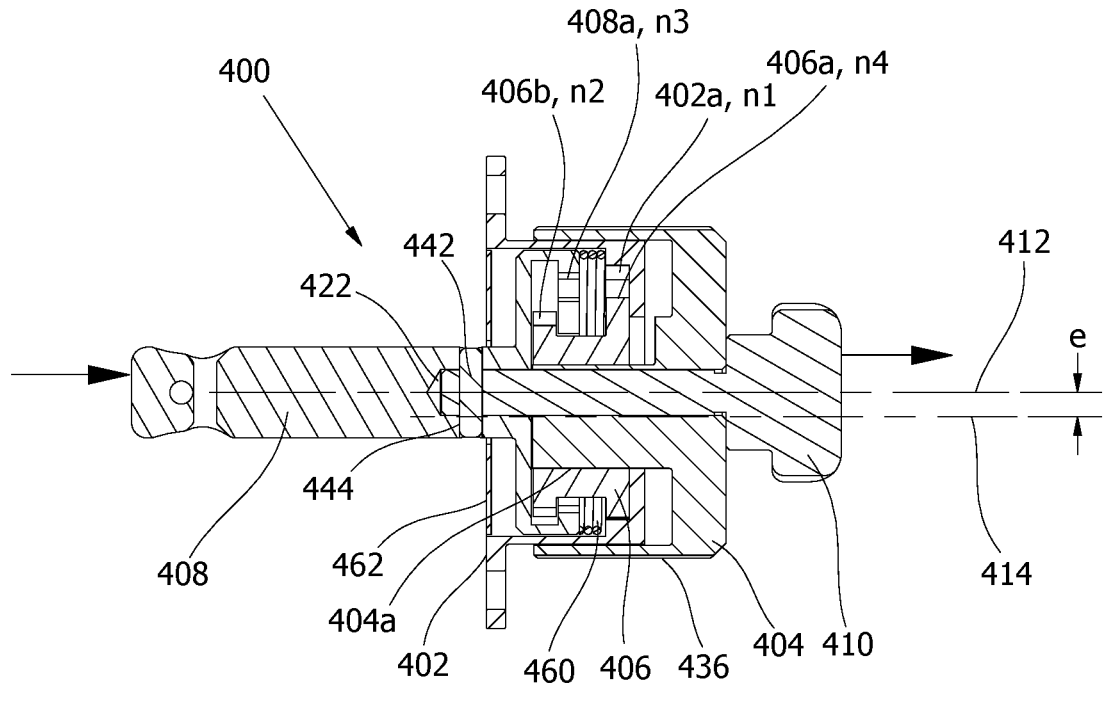

FIGS. 4A-4B are side schematic views of another exemplary speed reducing instrument tuner, in accordance with the present disclosure. The machine head reducer 400 shown in FIGS. 4A and 4B are cross-sectional views showing a machine head reducer 400 having additional features as compared to other examples described herein. There may be features not explicitly indicated or described in reference to this example for purposes of clarity. The machine head reducer 400 includes means to disengage the gear teeth or undulations by pulling a retainer knob against a spring to apply direct 1:1 motion to the output shaft to expedite string change or accomplish gross tuning tasks. The machine head reducer 400 shows a housing 402 having housing undulations 402a internal to the housing 402. The housing 402 has a surrounding input knob 404, having an input grip 436 surface for actuating the tuning mechanism of the machine head reducer 400. The machine head reducer 400 further includes an internal gear 406, an output shaft 408, and a retainer 410 interconnected there-through. Also shown within the output shaft 408 is a retainer hole 422 and a retainer pin hole 444 through which the retainer 410 is interlocked to the output shaft 408 by retainer pin 442 within a first axis 412 of the input knob 404, housing 402, output shaft 408, and retainer 410. The retainer 410 and the output shaft 408 rotate and operate about a first axis 412, while the gear 406 rotates and operates about a second axis 414. As shown in previous machine head reducers herein, the housing 402 includes housing undulations 402a that mesh and engage with the first gear undulations 406a of the gear 406, while the second gear undulations 406b of the gear 406 enmesh with the output shaft undulations 408a of the output shaft 408 to rotate and operate the machine head reducer 400. In a situation where a user would like to change or replace an instrument string using the machine head reducer 400 shown in FIGS. 4A and 4B, the retainer 410 can be pulled outward, in a direction indicated by the arrows in FIG. 4B, against resistance supplied by internal engage spring 460. A washer 462 is located between output shaft 408 and the mounting surface. Upon pulling the retainer 410 in this manner, retainer 410, output shaft 408, and input knob 404 translate together along axis 412, and cause output shaft gear undulations 408a to disengage with second gear undulations 406b allowing free rotation of the output shaft 408 and the retainer 410. Although the embodiment shown in FIGS. 4A and 4B indicate that the pull of retainer 410 in the direction of the arrows compresses internal engage spring 460 and results in the disengagement of output shaft gear undulations 408a with second gear undulations 406b thereby allowing free rotation of the output shaft 408 and connected retainer 410, the output shaft could also be pushed in the direction of the arrows shown in FIG. 4B and be rotationally actuated upon allowing direct 1:1 input rotation motion to drive the output shaft 408 and retainer 410 for the purpose of expedited instrument string replacement or installment.

Figure 5A:
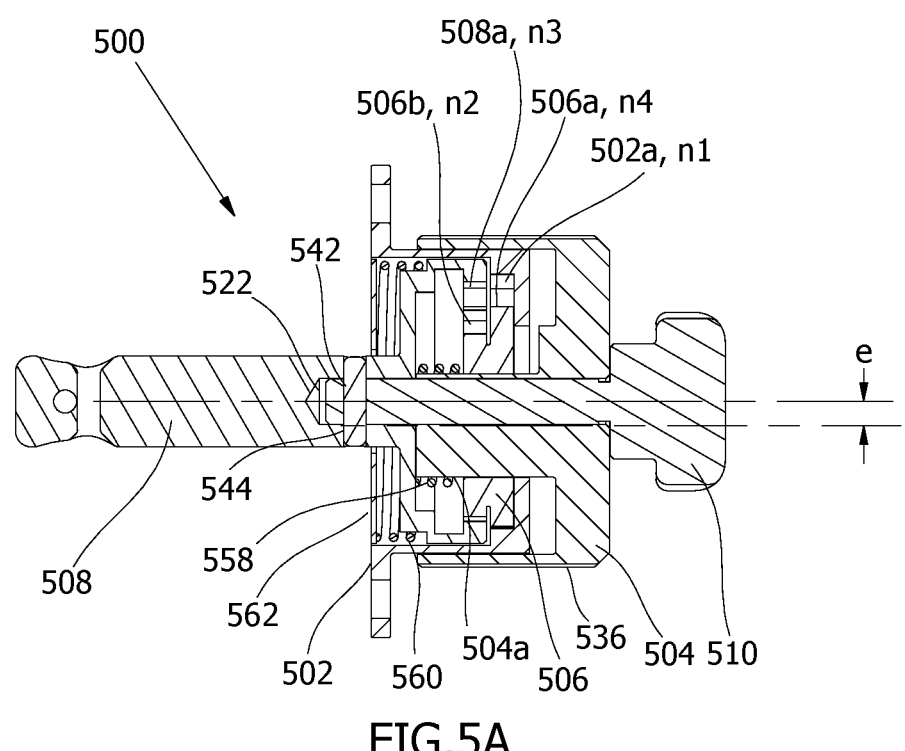
FIGS. 5A-5B are side schematic views of another exem- plary speed reducing instrument tuner, in accordance with the present disclosure.
Figure 5B:
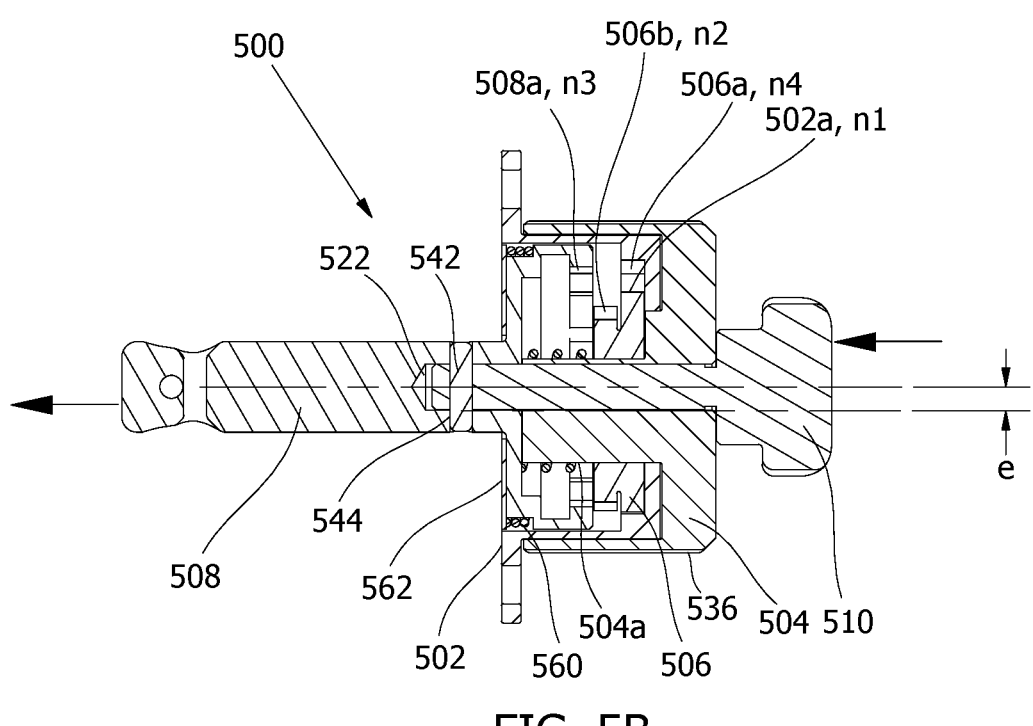

FIGS. 5A-5B are side schematic views of another exemplary speed reducing instrument tuner, in accordance with the present disclosure. The machine head reducer 500 shown in FIGS. 5A and 5B are cross-sectional views showing a machine head reducer 500 having additional features as compared to other examples described herein. There may be features not explicitly indicated or described in reference to this example for purposes of clarity. The machine head reducer 500 includes means to disengage the gear teeth or undulations by pushing retainer knob 510 in the direction of the arrows shown in FIG. 5B against a spring to apply direct 1:1 motion to the output shaft to expedite string change or accomplish gross tuning tasks. The machine head reducer 500 shows a housing 502 having housing undulations 502a internal to the housing 502. The housing 502 has a surrounding input knob 504 which includes input knob eccentric surface 504a, input grip 536 surface for actuating the tuning mechanism of the machine head reducer 500. The machine head reducer 500 further includes an internal gear 506, an output shaft 508, and a retainer 510 interconnected therethrough. Also shown within the output shaft 508 is a retainer hole 522 and a retainer pin hole 544 through which the retainer 510 is interlocked to the output shaft 508 by retainer pin 542 within a first axis 512 of the input knob 504, housing 502, output shaft 508, and retainer 510. The retainer 510 and the output shaft 508 rotate and operate about a first axis 512, while the gear 506 rotates and operates about a second axis 514. As shown in previous machine head reducers herein, the housing 502 includes housing undulations 502a that mesh and engage with the first gear undulations 506a of the gear 506, while the second gear undulations 506b of the gear 506 enmesh with the output shaft undulations 508a of the output shaft 508 to rotate and operate the machine head reducer 500. In a situation where a user would like to change or replace an instrument string using the machine head reducer 500 shown in FIGS. 5A and 5B, the retainer 510 can be pushed inward, in a direction indicated by the arrows in FIG. 5B, against resistance supplied by internal engage spring 560. A washer 562 is located between output shaft 508 and the mounting surface. Upon pulling the retainer 510 in this manner, retainer 510, output shaft 508, and input knob 504 translate together along axis 512, and cause output shaft gear undulations 508a to disengage with second gear undulations 506b allowing free rotation of the output shaft 508 and connected retainer 510. FIGS. 5A and 5B also show compression spring 558 acting between output shaft 508 and gear 506 which biases gear 506 toward housing 502 maintaining disengagement of output shaft gear undulations 508a with second gear undulations 506b and allowing free rotation of the output shaft 508 and connected retainer 510. Although the embodiment shown in FIGS. 5A and 5B indicate that the push of retainer 510 in the direction of the arrow compresses internal engage spring 560 and results in the disengagement of output shaft gear undulations 508a with second gear undulations 506b thereby allowing free rotation of the output shaft 508 and connected retainer 510, the output shaft could alternatively be pulled in the direction of the arrows shown in FIG. 5B and be rotationally actuated upon allowing direct 1:1 input rotation motion to drive the output shaft 508 and retainer 510 for the purpose of expedited instrument string replacement or installment.

Figures 6A, 6B, 6C:
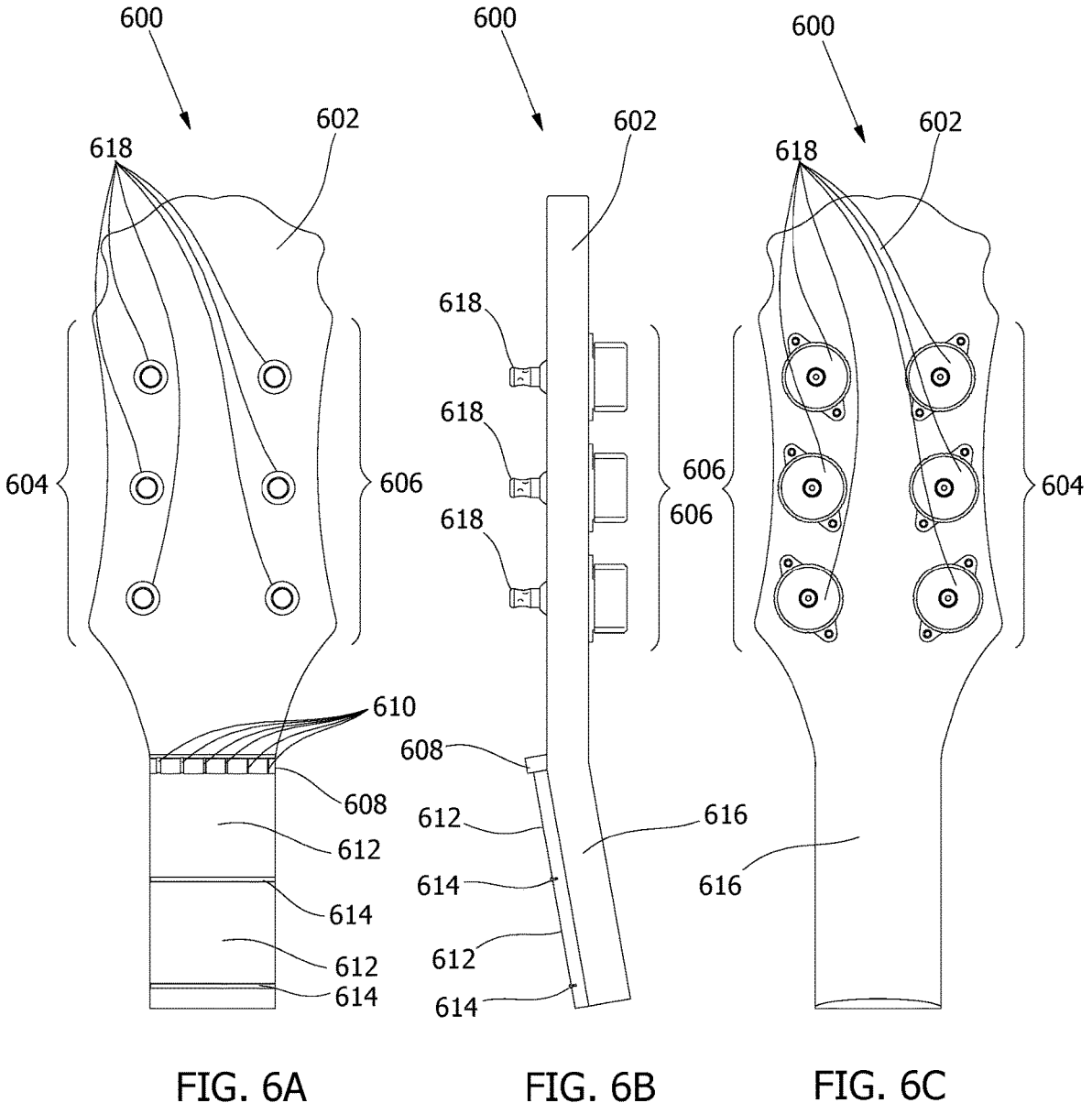
FIGS. 6A-6C are front, side, and back views, respectively, of an upper neck portion of a guitar including a 3+3 configuration of a set of speed reducing instrument tuners, in accordance with the present disclosure.

FIGS. 6A-6C are front, side, and back views, respectively, of an upper neck portion of a guitar including a 3+3 configuration of a set of speed reducing instrument tuners, in accordance with the present disclosure. A guitar neck portion 600 is shown, illustrating the arrangement of a 3+3 configuration of speed reducing instrument tuners 618 on a headstock 602 of the guitar neck portion 600. The guitar neck portion 600 also includes the position of a nut 608 having several nut slots 610, in this example, six, or one for each string. It should be noted that other instruments having any number of strings may utilize similar arrangements with additional corresponding parts to accommodate the additional strings. In the guitar neck portion 600, the fingerboard 612, several frets 614, and the back of the neck 616 are shown. On one side of the headstock 602, a first set of machine head reducers 604 is mounted, while on the opposite side of the headstock 602, a second set of machine head reducers 606 is mounted. The first set of machine head reducers 604 and the second set of machine head reducers 606 include individual machine head reducers 618. In this example, the first set of machine head reducers 604, the individual machine head reducers 618 are configured as reversing, CW input, CCW output or CCW input, CW output. The individual machine head reducers 618 of the second set of machine head reducers 606 are configured as non-reversing, CW input, CW output or CCW input, CCW output.

Figures 7A, 7B, 7C:
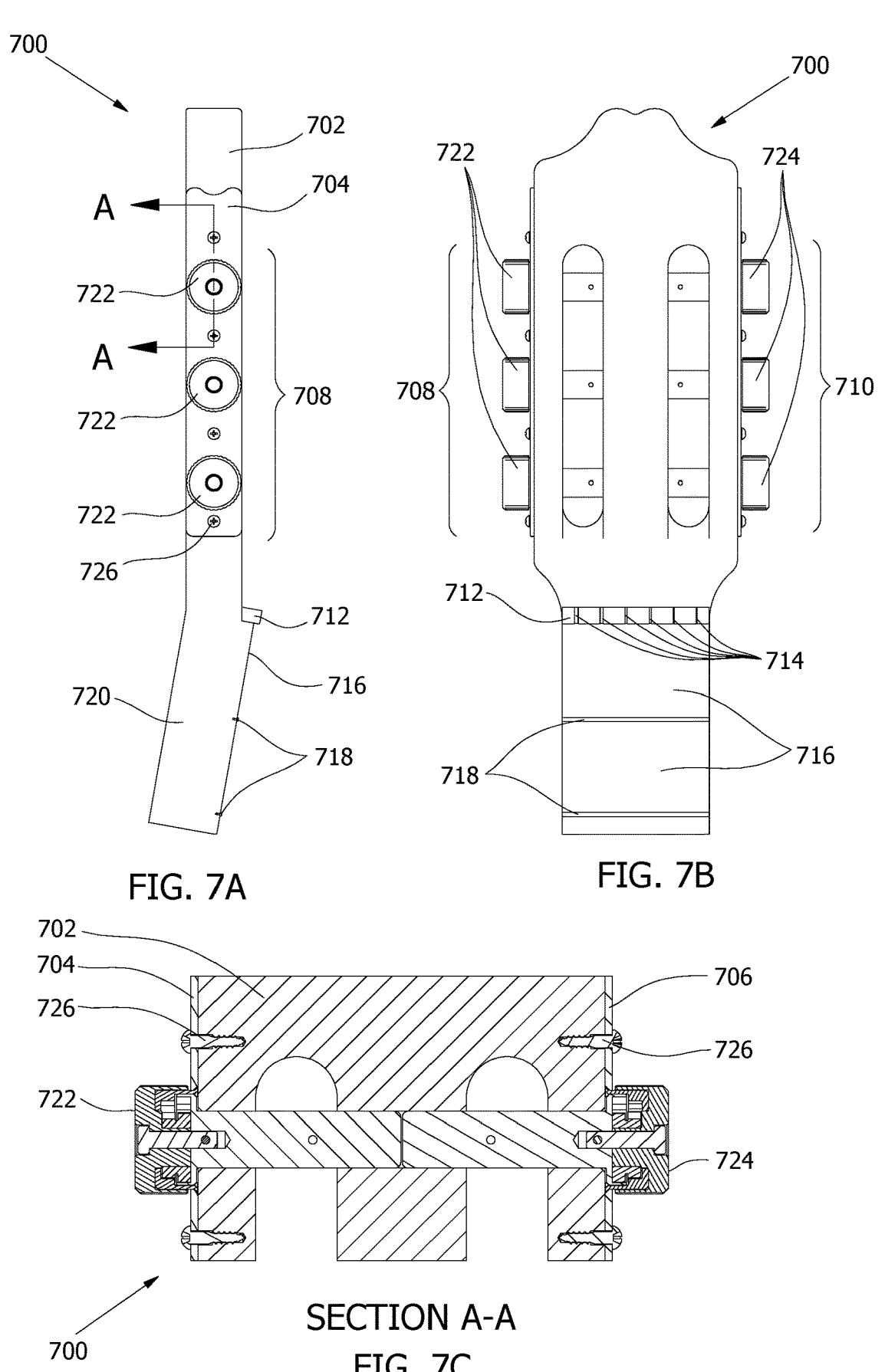
FIGS. 7A-7C are side, front, and cross-sectional views, respectively, of an upper neck portion of a classical-style guitar including a 3+3 configuration of a set of speed reducing instrument tuners, in accordance with the present disclosure.

FIGS. 7A-7C are side, front, and cross-sectional views, respectively, of an upper neck portion of a classical-style guitar including a 3+3 configuration of a set of speed reducing instrument tuners, in accordance with the present disclosure. A guitar neck portion 700 is shown, illustrating the arrangement of a 3+3 configuration of speed reducing instrument tuners on a head stock 702 of the guitar neck portion 700 of a classical-style guitar. The guitar neck portion 700 also includes the position of a nut 712 having several nut slots 714, in this example, six, or one for each string. It should be noted that other instruments having from one to about 20 or more strings may utilize similar arrangements with additional corresponding parts to accommodate the additional strings. In the guitar neck portion 700, the fingerboard 716, several frets 718, and the back of the neck 720 are shown. On one side of the head stock 702, a first set of machine head reducers 708 is mounted, while on the opposite side of the head stock 702, a second set of machine head reducers 710 is mounted. The first set of machine head reducers 708 and the second set of machine head reducers 710 include individual machine head reducers 722, 724. In this example, the first set of machine head reducers 708, the individual machine head reducers 722 are configured as non-reversing, CW input to CW output, or CCW input to CCW output. The individual machine head reducers 724 of the second set of machine head reducers 710 are configured as reversing, CW input to CCW output or CCW input to CW output. In the example shown, the first set of machine head reducers 708 and the second set of machine head reducers 710 are each mounted on a first assembly mounting plate 704 and a second assembly mounting plate 706, respectively and then affixed to the head stock 702 using several screws 726. In the cross-sectional view of FIG. 7C, the output posts of the individual machine head reducers 722, 724 are positioned through the head stock 702 as shown.

Figures 8A, 8B, 8C:
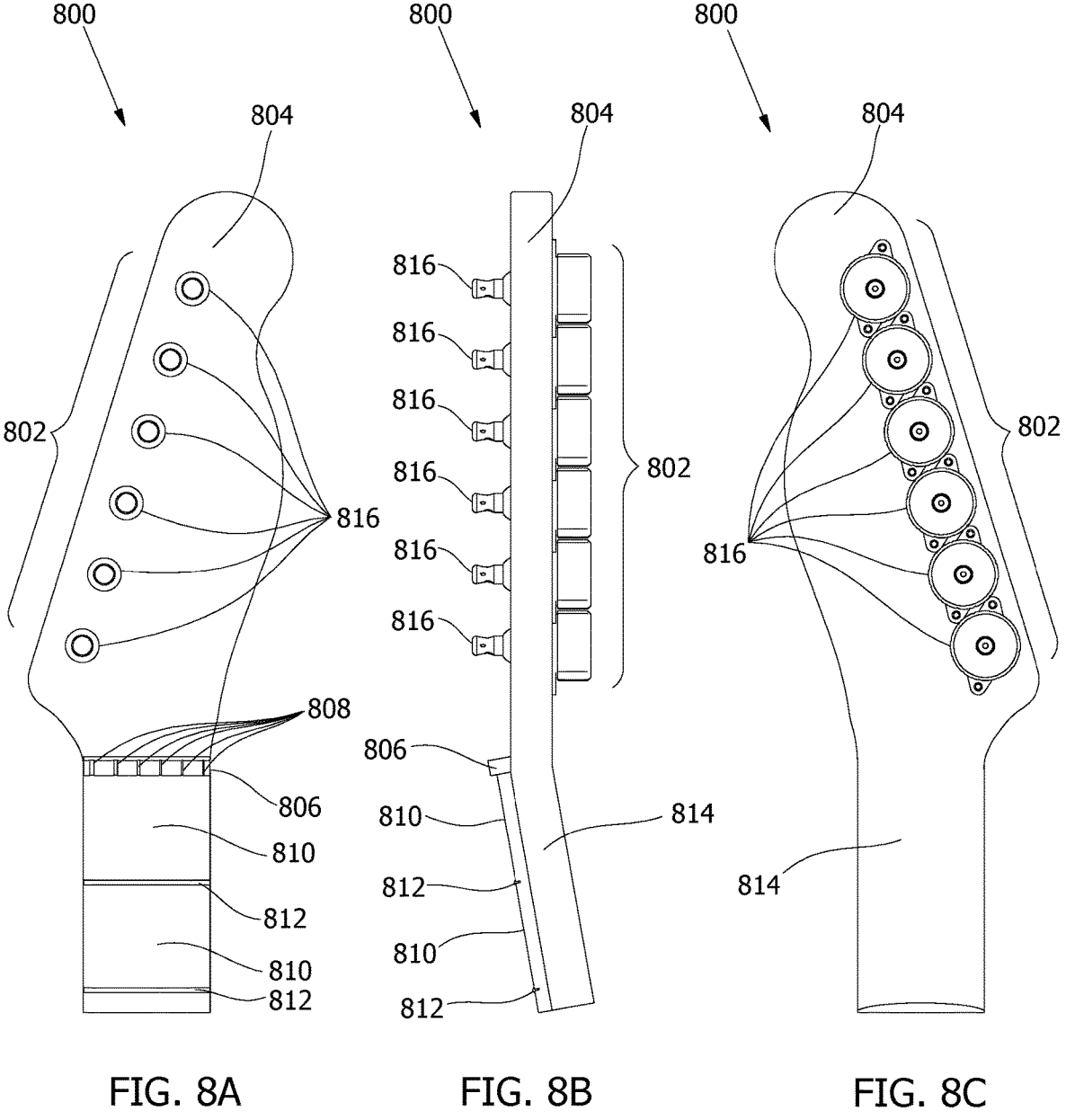
FIGS. 8A-8C are front, side, and back views, respectively, of an upper neck portion of a stringed instrument including an inline-6 configuration of a set of speed reducing instru- ment tuners, in accordance with the present disclosure.

FIGS. 8A-8C are front, side, and back views, respectively, of an upper neck portion of a stringed instrument including an inline-6 configuration of a set of speed reducing instrument tuners, in accordance with the present disclosure. A guitar neck portion 800 is shown, illustrating the arrangement of an inline-6 configuration of speed reducing instrument tuners on a head stock 804 of the guitar neck portion 800 of an electric-style guitar. The guitar neck portion 800 also includes the position of a nut 806 having several nut slots 808, in this example, six, or one for each string. It should be noted that other instruments having from one to about 20 or more strings may utilize similar arrangements with additional corresponding parts to accommodate the additional strings. In the guitar neck portion 800, the fingerboard 810, several frets 812, and the back of the neck 814 are shown. On one side of the head stock 804, a set of machine head reducers 802 is mounted flush to the back of the head stock 804. The set of machine head reducers 802 includes individual machine head reducers 816. In this example, the set of machine head reducers 802 including the individual machine head reducers 816 are configured as reversing CW input to CCW output, or CCW input to CW output.

Figures 9A, 9B, 9C:
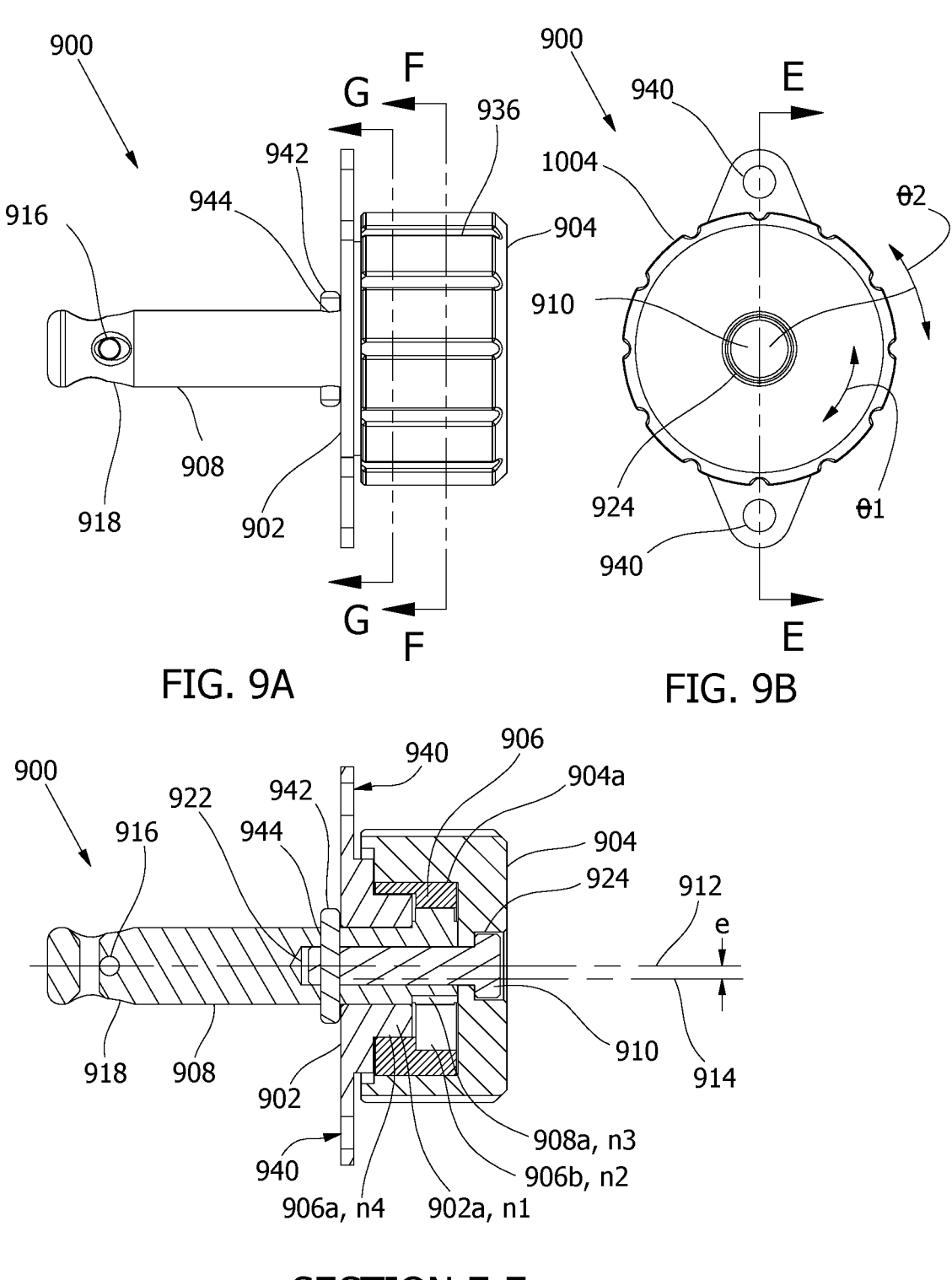
FIGS. 9A-9E are schematic views of an exemplary speed reducing instrument tuner, in accordance with the present disclosure.

FIGS. 9A-9E are schematic views of another exemplary speed reducing instrument tuner, in accordance with the present disclosure. As shown in FIG. 9A, a side view of a reversing machine head reducer 900 is shown. The machine head reducer 900 includes a housing 902 at a first end, with an input knob 904 attached thereto having an input grip 936. While a particular pattern of input grip 136 is shown, other patterns or arrangements of input grip features can be used based on ergonomic or aesthetic principles, and therefore the pattern and shape shown herein should not be considered to be limiting. The machine head reducer 900 further includes an output shaft 908 connected to and through the housing 902. The output shaft 908 further includes a shaft groove 918 configured circumferential around an upper portion of the output shaft 908, with an output receiver 916 or a hole positioned within the shaft groove 918 configured to accept and anchor a string for an instrument.

FIG. 9B illustrates an end view of the machine head reducer 900 of FIG. 9A. From this view, a retainer 910 is shown, recessed within the input knob retainer cavity 924. The retainer holds the output shaft 908 and the input knob 904 in place within the housing 902. Each side of the housing 902 further includes a mounting tab 940 with a hole positioned within the mounting tab 940 for mounting the machine head reducer 900 onto a flat surface. While a particular style and arrangement of mounting tab 940 is shown in FIG. 9B, other styles patterns or arrangements can be used. Indicators E-E designate the cross-sectional view as shown in FIG. 9C. It should be noted that the indicator θ1 denotes an input direction provided by a user in actuation of the input knob 904 of the machine head reducer 900, while θ2 indicates an output direction of the output shaft 908. As noted previously, the ratios of the number of teeth between the driver and driven gears determines the gear ratio and, subsequently, the speed ratio, and also determines the output direction of θ2 based on the direction of input θ1 as dictated by Equation (1).

FIG. 9C shows a cross-section of the machine head reducer 900 as designated by indicators E-E. This view illustrates an alternate arrangement of the components where the previously described inward facing undulations or teeth are shown facing outward (n1 and n3) and the previously described outward facing undulations or teeth are shown facing inward (n2 and n4). The input knob eccentric surface 904a forming eccentric axis 914 encompasses the outer surface of the compound gear 906. Also shown within the output shaft 908 is a retainer hole 922 and a retainer pin hole 944 through which the retainer 910 is interlocked to the output shaft 908 by retainer pin 942 within first axis 912 of the input knob 904, housing 902, output shaft 908, and retainer 910. The input knob 904, which can be considered to be a first driven member, is coupled to the housing 902, in this example, by being an integral part of the outer housing, but in alternate examples the input knob 904 can include a separate part fixedly or releasably attached to the housing 902 that operates as an actuator to drive the compound gear 906. In this and other exemplary examples the actuator can be externally powered, cause the machine head reducer 900 to operate at a constant or non-constant velocity when driven, or combinations thereof. Internal to the housing is a single compound gear 906, which can be considered to be a second driven member having a central axis which is substantially concentric with eccentric axis 914, having first gear undulations 906a (n4), and second gear undulations 906b (n2). The second gear undulations 906b (n2) are on a first, lower level of the gear 906, closer to the housing end, while the first gear undulations 906a (n4) are on a second, higher level of the gear 906, closer to the output shaft 908 end. On an external housing end of the output shaft 908, which can be considered a third driven member and having a central axis which is substantially concentric with first axis 912, are several output shaft undulations 908a (n3), while an external portion of the housing 902, which includes a central axis 912, includes several housing undulations 902a (n1). This plurality of substantially cylindrical undulations (represented by n1) are substantially parallel and equidistant to the central axis and face outwards from the central axis of the housing 902. "e" designates the eccentricity of the second axis 914 relative to the first axis 912. The input knob 904 is located upon and rotates about first axis 912 and has an eccentric surface 904a which establishes a parallel second axis 914 which locates the position of compound gear 906 within the machine head reducer 900.

Figure 9D:
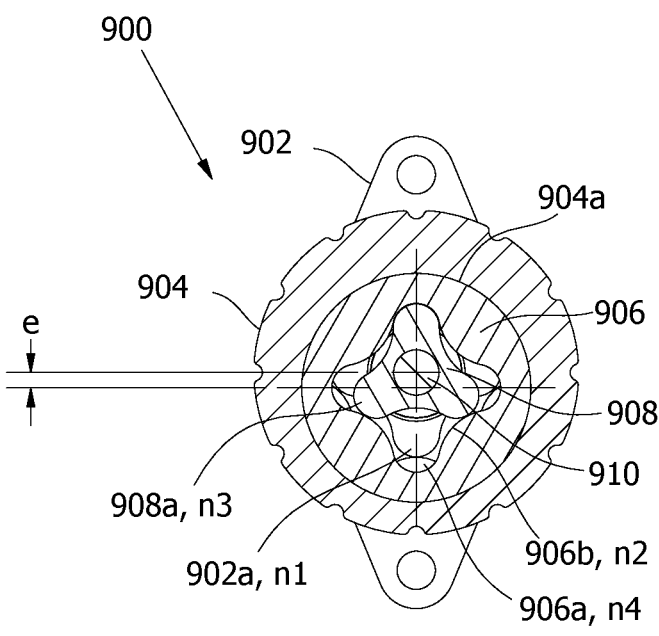

FIG. 9D illustrates a cross-section end view of the machine head reducer 900 as designated by indicators F-F in FIG. 9A. Within the housing 902 end shown, the output shaft undulations 908a (n3) protrude from an outer surface of the output shaft 908. The indicator n3 is a number of undulations associated with the outer surface output shaft undulations 908a. The output shaft undulations 908a interface with and enmesh with the second gear undulations 906b, the number of which is indicated by n2. Shown in the background, are the first gear undulations 906a, which interface with the housing undulations 902a, which will be described in further detail in FIG. 9E and have a number of undulations represented by indicators n2 and n3, respectively.

Figure 9E:
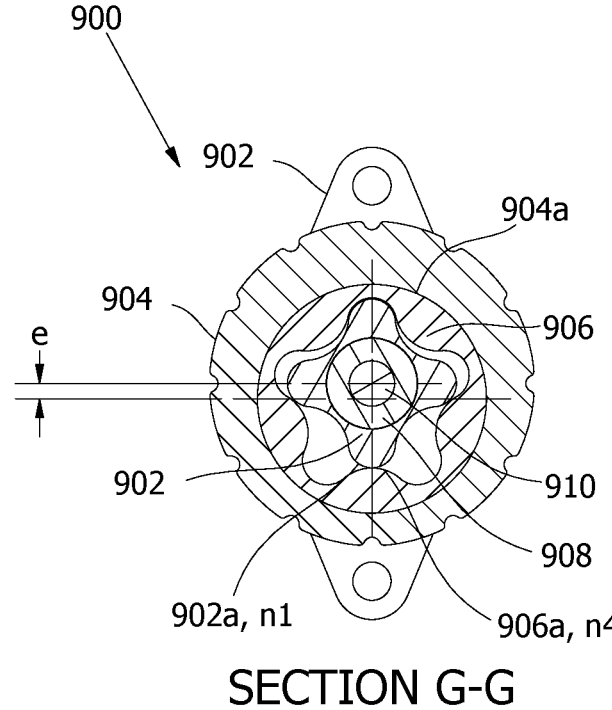

FIG. 9E illustrates a cross-section end view of the machine head reducer 100 as designated by indicators G-G in FIG. 9A. Shown within the output shaft 908 end, the first, lower part of the gear 906 is highlighted. Housing 902 includes several outward facing undulations 902a, the number of which is designated by n1. Also shown here are the first gear undulations 906a, the number of which is designated by n4, which engage with the housing undulations 902a on housing 902. By taking the portions of the gear 906 shown and described in regard to FIGS. 9D and 9E, it can be shown that as input knob 904 is rotated in direction θ1, the eccentric knob input surface 904*a* rotates eccentrically causing the first gear undulations 906*a* of gear 906 to engage in succession with the housing undulations 902*a*. As gear 906 is a single, fixedly connected, compound gear 906, each section of gear 906 rotate together as a single entity. As input knob 904 is rotated in direction θ1, the eccentric knob input surface 904*a* rotates eccentrically and also causes the second gear undulations 906*b* of gear 906 to engage, in succession, with the output shaft undulations 908*a* resulting in the input to output ratio according to equation (1). In this example of a reversing arrangement, the stationary external housing surface 902*a* has 4 teeth or undulations (n1), The rotating external output shaft surface 908*a* has 3 teeth or undulations (n3), the first internal surface of the compound gear 906*a* has 5 teeth or undulations (n4), which mesh with the 4 teeth or undulations of the stationary housing, the second internal surface of the compound gear 906*b* has 4 teeth or undulations (n2) which mesh with the 3 teeth or undulations of the output shaft, the result when computed according to Equation (1): $\theta2=1-[(n1\cdot n2)/(n3\cdot n4)]$ is: $\theta2=1-[(4*4)/(3*5)]$ which equals 1–[16/15], which equals approximately 1–1.06667 which equals approximately –0.06667, where the inverse equals approximately 1/–0.06667 or –15, corresponding to an understood ratio of –15:1. While this equation can be used in determining the number of undulations, in examples or embodiments described herein, the number of undulations one or more paired surfaces can be unequal to the number of undulations of another paired surface, or the number of undulations one or more paired surfaces can be equal to the number of undulations of another paired surface. In still other examples, gearing or driven members in embodiments may include multiple ratios. Furthermore, one machine head reducer included in an assembly may include individual machine heads having different ratios, for example, where one instrument string can have a first ratio of internal gearing, where another instrument string can have a second ratio of internal gearing. In examples, each instrument string can have a different ratio of gearing up to including as many ratios as numbers of strings are included in an instrument.

Figure 10A:
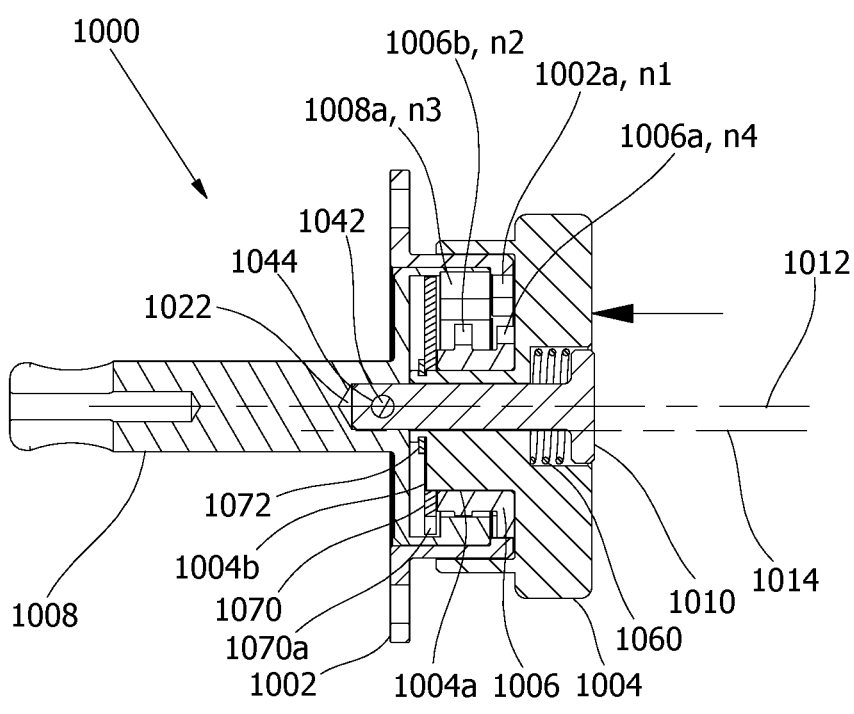
FIGS. 10A-10B are schematic views of an exemplary speed reducing instrument tuner, in accordance with the present disclosure.
Figure 10B:
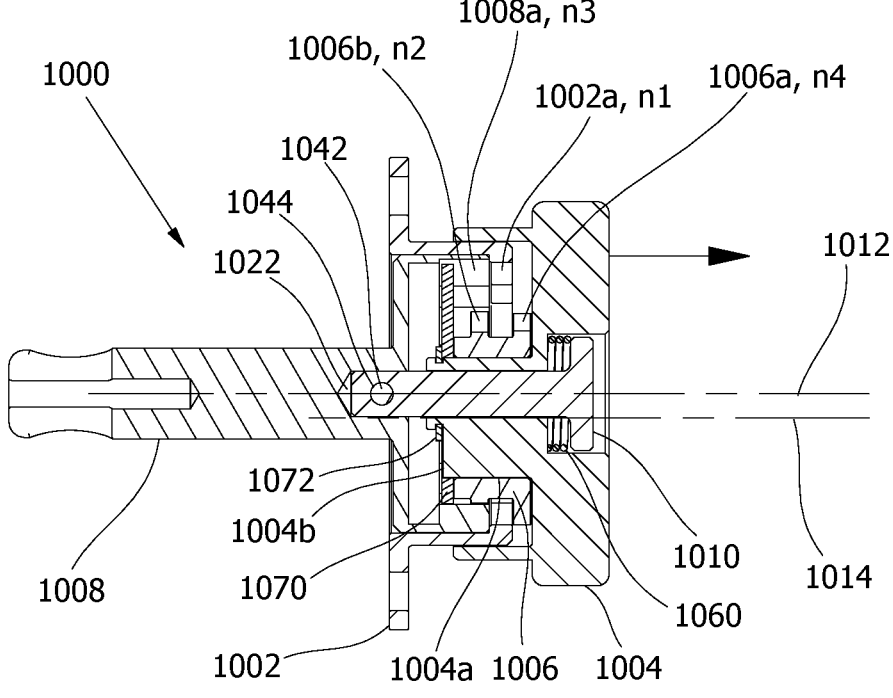

FIGS. 10A-10B are side schematic views of another exemplary speed reducing instrument tuner, in accordance with the present disclosure. The machine head reducer 1000 shown in FIGS. 10A and 10B are cross-sectional views showing a machine head reducer 1000 having additional features as compared to other examples described herein. There may be features not explicitly indicated or described in reference to this example for purposes of clarity. The machine head reducer 1000 shows a housing 1002 having housing undulations 1002*a* internal to the housing 1002. The housing 1002 has a surrounding input knob 1004 which includes input knob eccentric surface 1004*a* for actuating the tuning mechanism of the machine head reducer 1000. A clutch 1070 having at least one clutch tooth or undulation 1070*a* is secured to the input knob 1004 by input knob clutch key 1004*b* and clutch retainer 1072. In other examples, the clutch and associated components can be included in a single piece. The machine head reducer 1000 further includes an internal gear 1006, an output shaft 1008, and a retainer 1010 interconnected there-through. Also shown within the output shaft 1008 is a retainer pin hole 1044 through which the retainer 1010 is interlocked to the output shaft 1008 by retainer pin 1042 within a first axis 1012 of the input knob 1004, housing 1002, output shaft 1008, and retainer 1010. The retainer 1010 and the output shaft 1008 rotate and operate about a first axis 1012, while the gear 1006 rotates and operates about a second axis 1014. The machine head reducer 1000 further includes means to disengage the first gear teeth or undulations 1006*a* from the housing gear teeth or undulations 1002*a* and to engage at least one clutch tooth or undulation 1070*a* with the output shaft gear teeth or undulations 1008*a* by pulling input knob 1004 against resistance supplied by engagement spring 1060 from a first position along the housing central axis as shown in FIG. 10A to a second position along the housing central axis as shown in FIG. 10B in the direction of the arrow shown in FIG. 10B. The engagement spring, also referred to as a spring element can comprise a conventional spring or elastic element, or comprising a rubber, soft rubber, such as a silicone or polyurethane material. Upon pulling the input knob 1004 in this manner, input knob 1004, gear 1006, clutch 1070, and clutch retainer 1074 translate together along axis 1012 to enable direct 1:1 rotational motion from the input knob 1004 to the output shaft 1008 in order to expedite string change or accomplish gross tuning tasks. Upon releasing the input knob 1004, the engagement spring 1060 returns the input knob 1004 in the direction of the arrow shown in FIG. 10A from the second position along the housing central axis shown in FIG. 10B to the first position along the housing central axis shown in FIG. 10A while re-engaging the first gear teeth or undulations 1006*a* with the housing gear teeth or undulations 1002*a* and disengaging at least one input knob clutch tooth or undulation 1070*a* from the output shaft gear teeth or undulations 1008*a* thereby re-enabling the fine tuning reduction ratio according to equation (1). As shown in previous machine head reducers herein, the housing 1002 includes housing undulations 1002*a* that mesh and engage with the first gear undulations 1006*a* of the gear 1006, while the second gear undulations 1006*b* of the gear 1006 enmesh with the output shaft undulations 1008*a* of the output shaft 1008 to rotate and operate the machine head reducer 1000.

It should be noted that, in alternate embodiments, variations of the number of undulations, arrangement of undulations, or shapes of the undulations can be present in configurations as described herein. It should further be noted that in aspects of the present disclosure, machine head reducers can include wherein the second driven member is configured such that a clockwise rotation of the first driven member results in a clockwise rotation of the third driven member, or alternatively where the second driven member is configured such that a clockwise rotation of the first driven member results in a counter-clockwise rotation of the third driven member. In still other embodiments of the present disclosure, machine head reducers can include wherein the second driven member is configured such that a counter-clockwise rotation of the first driven member results in a clockwise rotation of the third driven member, or alternatively, where the second driven member is configured such that a counter-clockwise rotation of the first driven member results in a counter-clockwise rotation of the third driven member. In examples, machine head reducers as described herein can include wherein one driven member is configured such that a rotation of the driven member in a first direction results in a rotation of corresponding member to be driven in the same direction, or alternatively where a driven member is configured such that a rotation in of a corresponding member is driven in an opposite direction. Combinations thereof as described herein can also be considered.

It should be noted that in any of the exemplary embodiments described herein, the first driven member can be coupled to one or more external motors or electronic devices that can actuate the first driven member and, in turn, operate the machine head reducer. These external motors or electronics can be operated or initiated with the use of a computer-controlled, application-controlled, or other control system. The external control system or assembly can further include frequency detection instructions or operative functions stored within a hardware configuration which can include a computer readable medium which can be used to perform one or more of the processes described above. The hardware configuration can include any type of mobile devices, such as smart telephones, laptop computers, tablet computers, cellular telephones, personal digital assistants, etc. Further, the hardware configuration can include one or more processors of varying core configurations and clock frequencies. The hardware configuration can also include one or more memory devices that serve as a main memory during operations, calculations, or simulations as described herein. For example, during operation, a copy of the software that supports the above-described operations can be stored in one or more memory devices. One or more peripheral interfaces, such as keyboards, mice, touchpads, computer screens, touchscreens, etc., for enabling human interaction with and manipulation of the hardware configuration can also be included. Exemplary hardware configurations can also include a data bus, one or more storage devices of varying physical dimensions and storage capacities, such as flash drives, hard drives, random access memory, etc., for storing data, such as images, files, and program instructions for execution by the one or more processors. One or more network interfaces for communicating via one or more networks, such as Ethernet adapters, wireless transceivers, or serial network components, for communicating over wired or wireless media using protocols can further be included.

Additionally, hardware configurations in certain embodiments can include one or more software programs that enable the functionality described herein. The one or more software programs can include instructions that cause the one or more processors to perform the processes, functions, and operations described herein related to calculations, inputs, tuner or machine head operations, and combinations thereof. Copies of the one or more software programs can be stored in the one or more memory devices and/or on in the one or more storage devices. Likewise, the data utilized by one or more software programs can be stored in the one or more memory devices and/or on in the one or more storage devices.

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, or EEPROM. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A machine head reducer, comprising:

a housing comprising a central axis and a surface comprising a plurality of undulations (n1) that are substantially parallel and equidistant to the central axis;

a first driven member comprising a central axis that is substantially concentric with the central axis of the housing, the first driven member comprising a second axis that is substantially parallel and eccentric to the central axis of the housing;

a second driven member comprising a central axis that is substantially concentric with second axis of the first driven member and comprising:

a first surface comprising a plurality of undulations (n4) that are substantially parallel and equidistant to the second driven member central axis and being in mesh contact with the undulations (n1) of the housing surface;

a second surface comprising a plurality of undulations (n2) that are substantially parallel and equidistant to the second driven member central axis; and a third driven member comprising a central axis being substantially concentric with the housing central axis and comprising a surface comprising a plurality of undulations (n3) where the undulations of the surface of the third driven member are substantially parallel and equidistant to the central axis of the third driven member and are in mesh contact with the plurality of undulations of the second surface of the second driven member (n2).

2. The machine head reducer of claim 1, wherein:

the number of housing undulations (n1) is from about 2 to about 100;

the number of first surface undulations of the second driven member (n3) is from about 2 to about 100;

the number of second surface undulations of the second driven member (n2) is from about 2 to about 100; and the number of undulations of the surface of the third driven member (n4) is from about 2 to about 100.

3. The machine head reducer of claim 2, wherein the number of undulations of housing surface (n1), the number of undulations of the second surface of the second driven member (n2), the number of undulations of the second driven member first surface (n3), and the number of undulations of surface of the third driven member (n4) are determined using the equation:

$$\theta2 = 1 - [(n1 \cdot n2)/(n3 \cdot n4)];$$

and wherein θ2 is a rotational direction of the third driven member.

4. The machine head reducer of claim 1, wherein at least one of the surfaces comprising a plurality of undulations are involute.

5. The machine head reducer of claim 1, wherein at least one of the surfaces comprising a plurality of undulations are cylindrical.

6. The machine head reducer of claim 1, wherein at least one of the surfaces comprising a plurality of undulations are curved.

7. The machine head reducer of claim 1, wherein at least one of the surfaces comprising a plurality of undulations are helical.

8. The machine head reducer of claim 1, wherein the number of undulations of the second driven member first surface is unequal to the number of undulations of the second surface of the second driven member.

9. The machine head reducer of claim 1, further comprising an actuator coupled to the housing.

10. The machine head reducer of claim 9, wherein the first driven member is driven by the actuator.

11. The machine head reducer of claim 9, wherein the actuator is externally powered.

12. The machine head reducer of claim 1, wherein the machine head reducer operates at a constant velocity.

13. The machine head reducer of claim 1, wherein the machine head reducer operates at a non-constant velocity.

14. The machine head reducer of claim 1, wherein the third driven member further comprises an output receiver wherein the output receiver is configured to receive an instrument string.

15. The machine head reducer of claim 1, wherein the second driven member comprises a single compound gear comprising the first surface and the second surface.

16. The machine head reducer of claim 1, further comprising an instrument string locking mechanism positioned within the third driven member.

17. The machine head reducer of claim 1, wherein the second driven member is configured such that a rotation direction of the first driven member results in a same rotation direction of the third driven member.

18. The machine head reducer of claim 1, wherein the second driven member is configured such that a rotation direction of the first driven member results in an opposite rotation direction of the third driven member.

19. The machine head reducer of claim 1, wherein:

the plurality of undulations (n1) of the surface of the housing face inward toward the central axis;

the undulations of the first surface of the second driven member (n4) and the undulations of the second surface of the second driven member (n2) face outward from the central axis of the second driven member; and the undulations of the surface of the third driven member (n3) face inward toward the central axis.

20. The machine head reducer of claim 1, wherein:

the plurality of undulations (n1) of the surface of the housing face outward away from the central axis;

the undulations of the first surface of the second driven member (n4) and the undulations of the second surface of the second driven member (n2) face inward toward the central axis of the second driven member; and the undulations of the surface of the third driven member (n3) face outward away from the central axis.

21. A machine head assembly, comprising:

a plurality of machine head reducers, each machine head reducer comprising:

a housing comprising a central axis and a surface comprising a plurality of undulations (n1) that are substantially parallel and equidistant to the central axis;

a first driven member comprising a central axis that is substantially concentric with the central axis of the housing, the first driven member comprising a second axis that is substantially parallel and eccentric to the central axis of the housing;

a second driven member comprising a central axis that is substantially concentric with the second axis of the first driven member and comprising:

a first surface comprising a plurality of undulations (n4) that are substantially parallel and equidistant to the second driven member central axis and being in mesh contact with the undulations (n1) of the housing surface;

a second surface comprising a plurality of undulations (n2) that are substantially parallel and equidistant to the second driven member central axis; and a third driven member comprising a central axis being substantially concentric with the housing central axis and comprising a surface comprising a plurality of undulations (n3) where the undulations of the surface of the third driven member are substantially parallel and equidistant to the central axis of the third driven member and are in mesh contact with the second surface undulations of the second driven member (n2).

22. The machine head assembly of claim 21, wherein at least one machine head reducer has a gear ratio which is unequal to the gear ratio of at least one other machine head reducer.

23. The machine head assembly of claim 21, wherein the second driven member of a least one machine head reducer is configured such that a rotation direction of the first driven member results in a same rotation direction of the third driven member.

24. The machine head assembly of claim 21, wherein the second driven member of at least one machine head reducer is configured such that a rotation direction of the first driven member results in an opposite rotation direction of the third driven member.

25. The machine head reducer of claim 1, wherein the third driven member has a first position along the first housing central axis where the undulations of the surface of the third driven member are engaged in mesh contact with the second driven member second surface undulations and the third driven member comprises a second position along the first housing central axis wherein the undulations of the surface of the third driven member are disengaged from mesh contact with the second driven member second surface undulations.

26. The machine head reducer of claim 25, further comprising a biasing element wherein the third driven member is biased to the first position along the housing central axis.

27. The machine head reducer of claim 1, further comprising at least one first driven member clutch tooth or undulation wherein the first driven member has a first position along the housing central axis wherein the undulations of the first surface of the second driven member are engaged in mesh contact with the undulations of the surface of the housing and at least one first driven member clutch tooth or undulation is disengaged with the undulations of the surface of the third driven member and the first driven member has a second position along the housing central axis wherein the undulations of the first surface of the second driven member are disengaged from mesh contact with the undulations of the surface of the housing and at least one first driven member clutch tooth or undulation is engaged with the undulations of the surface of the third driven member.

28. The machine head reducer of claim 27, further comprising a biasing element wherein the first driven member is biased to the first position along the housing central axis.

* * * * *